US011972657B2

(12) United States Patent
Rodriguez et al.

(10) Patent No.: US 11,972,657 B2
(45) **Date of Patent: *Apr. 30, 2024**

(54) SYSTEMS AND METHODS FOR MODULAR ELECTRONIC GAMING MACHINES

(71) Applicant: Aristocrat Technologies, Inc., Las Vegas, NV (US)

(72) Inventors: Frank Rodriguez, Las Vegas, NV (US); Bruce Urban, Las Vegas, NV (US); Dominic DeMarco, Round Rock, TX (US); James Stair, Las Vegas, NV (US); Martin Holland, Warriewood (AU); Martin Mirakhour, Castle Hill (AU)

(73) Assignee: Aristocrat Technologies, Inc., Las Vegas, NV (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/537,083

(22) Filed: Nov. 29, 2021

(65) Prior Publication Data

US 2022/0084355 A1 Mar. 17, 2022

Related U.S. Application Data

(63) Continuation of application No. 16/582,885, filed on Sep. 25, 2019, now Pat. No. 11,238,693.

(51) Int. Cl.

| | |
|---|---|
| ***A63F 13/00*** | (2014.01) |
| ***G07F 17/32*** | (2006.01) |
| *G07F 17/34* | (2006.01) |

(52) U.S. Cl.
CPC ...... *G07F 17/3216* (2013.01); *G07F 17/3223* (2013.01); *G07F 17/3209* (2013.01); *G07F 17/3213* (2013.01); *G07F 17/3241* (2013.01); *G07F 17/34* (2013.01)

(58) Field of Classification Search
CPC ......................... G07F 17/3216; G07F 17/3202
See application file for complete search history.

(56) References Cited

U.S. PATENT DOCUMENTS

| | | | |
|---|---|---|---|
| D464,377 | S | 10/2002 | Wurz |
| 6,997,810 | B2 | 2/2006 | Cole |
| D531,677 | S | 11/2006 | Mallory |
| D587,319 | S | 2/2009 | Moises Deiab |
| D599,858 | S | 9/2009 | Lesley |

(Continued)

OTHER PUBLICATIONS

Penn Engineering, SK Self-Clinching Keyhole Fasteners, Bulletin SK-518, 2018, Danboro, Pennsylvania USA.

(Continued)

*Primary Examiner* — David L Lewis
*Assistant Examiner* — Eric M Thomas
(74) *Attorney, Agent, or Firm* — Armstrong Teasdale LLP

(57) ABSTRACT

A modular electronic gaming machine is provided. The modular electronic gaming machine includes a structural core including a gaming controller and a plurality of coupling mechanisms including a first coupling mechanism. The first coupling mechanism comprises an electrical connector. The first coupling mechanism is configured to couple to a first peripheral device to provide electrical power and structural support to the first peripheral device. The first coupling mechanism is configured to releasably couple to the first peripheral device.

20 Claims, 29 Drawing Sheets

(56) References Cited

U.S. PATENT DOCUMENTS

| | | | | |
|---|---|---|---|---|
| 7,905,783 | B2 | 3/2011 | Cole | |
| 8,016,683 | B2 | 9/2011 | Cole | |
| D673,620 | S | 1/2013 | Johnson | |
| D678,956 | S | 3/2013 | Lesley | |
| D685,033 | S | 6/2013 | Wudtke | |
| D691,665 | S | 10/2013 | Chudek | |
| 8,764,573 | B2 | 7/2014 | Johnson | |
| D730,993 | S | 6/2015 | Castro | |
| 9,741,200 | B2 | 8/2017 | Lesley | |
| 9,811,969 | B2 * | 11/2017 | Salzman | G07F 17/3241 |
| D819,747 | S | 6/2018 | Castro | |
| 2008/0182642 | A1 | 7/2008 | Cole | |
| 2009/0054159 | A1 * | 2/2009 | Gadda | G07F 17/32 463/46 |
| 2018/0108209 | A1 | 4/2018 | Amegadjie | |
| 2021/0035402 | A1 * | 2/2021 | Rye | G07F 17/3216 |

OTHER PUBLICATIONS

Bayer Material Science, Snap-Fit Joints for Plastics—A Design Guide, 2013, Pittsburgh, Pennsylvania USA.

Office Action dated Apr. 1, 2021 for U.S. Appl. No. 16/582,885 (pp. 1-8).

Office Action (Notice of Allowance and Fees Due (PTOL-85) dated Sep. 10, 2021 for U.S. Appl. No. 16/582,885 (pp. 1-5).

* cited by examiner

SYSTEMS AND METHODS FOR MODULAR ELECTRONIC GAMING MACHINES

CROSS-REFERENCE TO RELATED APPLICATIONS

This application is a continuation of and claims priority to U.S. patent application Ser. No. 16/582,885, filed Sep. 25, 2019, all of which is incorporated herein by reference in its entirety.

TECHNICAL FIELD

The field of the disclosure relates generally to electronic gaming, and more particularly, to electronic gaming machines having modular components that allow for the components to be easily changed and replaced to form various different types of electronic gaming machines.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Many gaming machines are assembled into a permanent configuration and cannot be changed after assembly, except to replace broken parts. Furthermore, once these gaming machines get old, they are considered to no long have any useful function. The old gaming machines are usually decommissioned and thrown away. Accordingly, it would be useful to have a system that allows for gaming systems that may be changed between different configurations.

BRIEF DESCRIPTION

In some aspects, a modular electronic gaming machine is provided. The modular electronic gaming machine includes a structural core. In the structural core is a gaming controller. The structural core also has a plurality of coupling mechanisms. At least one of the coupling mechanisms includes an electrical connector. The coupling mechanism is configured to couple to a first peripheral device to provide electrical power and structural support to the first peripheral device. The coupling mechanism also is configured to releasably couple to the first peripheral device, so that the device may be removed.

In some further aspects, a modular electronic gaming machine system provided. The system includes a structural core with a gaming controller. The system also includes a plurality of peripheral devices. The plurality of peripheral devices are each removably attached to the structural core. This means that each of the plurality of peripheral devices may be detached from the structural core. Each peripheral device of the plurality of peripheral devices is attached to the structural core via a coupling mechanism which provides electrical communication with the structural core. The gaming controller is programmed to communicate with each of the plurality of peripheral devices through these coupling mechanisms.

In a further aspect, a method of operating a modular electronic gaming machine is provided. The method includes removably attaching a plurality of peripheral devices to a structural core of the modular electronic gaming machine. The method further includes controlling the plurality of peripheral devices via a gaming controller integrated into the structural core. The method also includes removing a first device of the plurality of peripheral devices from the structural core. subsequent to removing the first device, the method allows for attaching a second device to the structural core and controlling that second device via the gaming controller.

DETAILED DESCRIPTION

A modular electronic gaming machine (EGM) that allows for parts to be swapped out to support various different configurations of EGMs. In the exemplary embodiment, the structural supports of the modular gaming machine include electrical connectors, that allow the electronic parts to be connected to power. The electrical connectors would support electrical quick-disconnect for all removable components as required. For example, a monitor could be easily removed and replaced with a newer monitor or a monitor that supports a different configuration. The monitor may also be a completely different style of the monitor. The side saddlebags of the EGM could be removed and/or replaced with premium speakers or coverplates. The button deck could be removable and a faceplate could cover up where it used to be. These coverplates and faceplates may be decorative panels and integrated into the design and configuration of the corresponding EGM. In some embodiments, a modular electronic gaming machine could be converted into a kiosk. In other embodiment, two modular electronic gaming machines could be converted into a dual machine with a large display. In the exemplary embodiment, the modular EGM includes a structural core that the plurality of peripherals are capable of being removably coupled to. In the exemplary embodiment, the peripherals are attached to the structural core using coupling mechanisms that include guiding mechanisms, locking mechanisms, and electrical connections.

Figure 1:
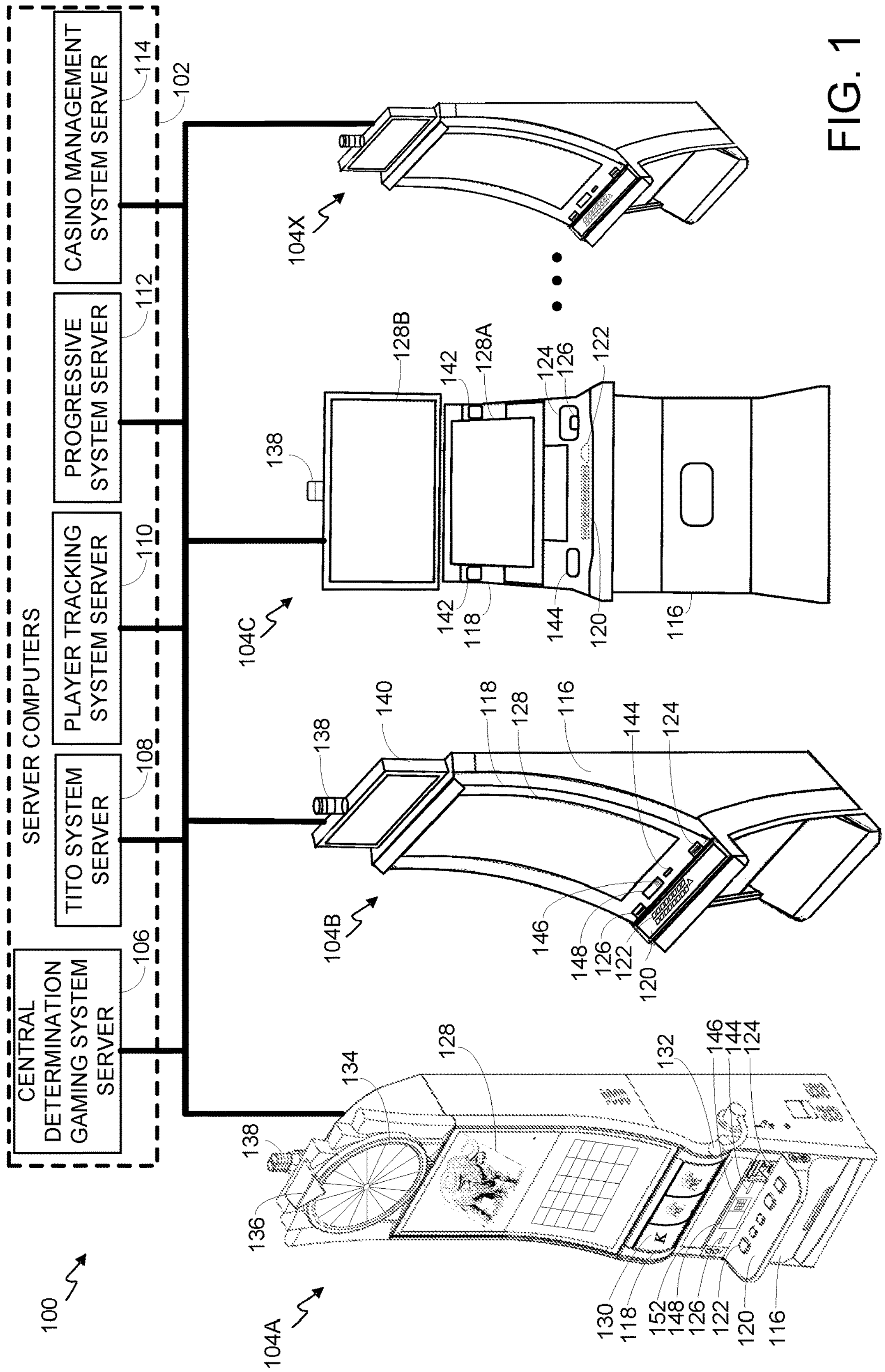
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door (not shown) which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
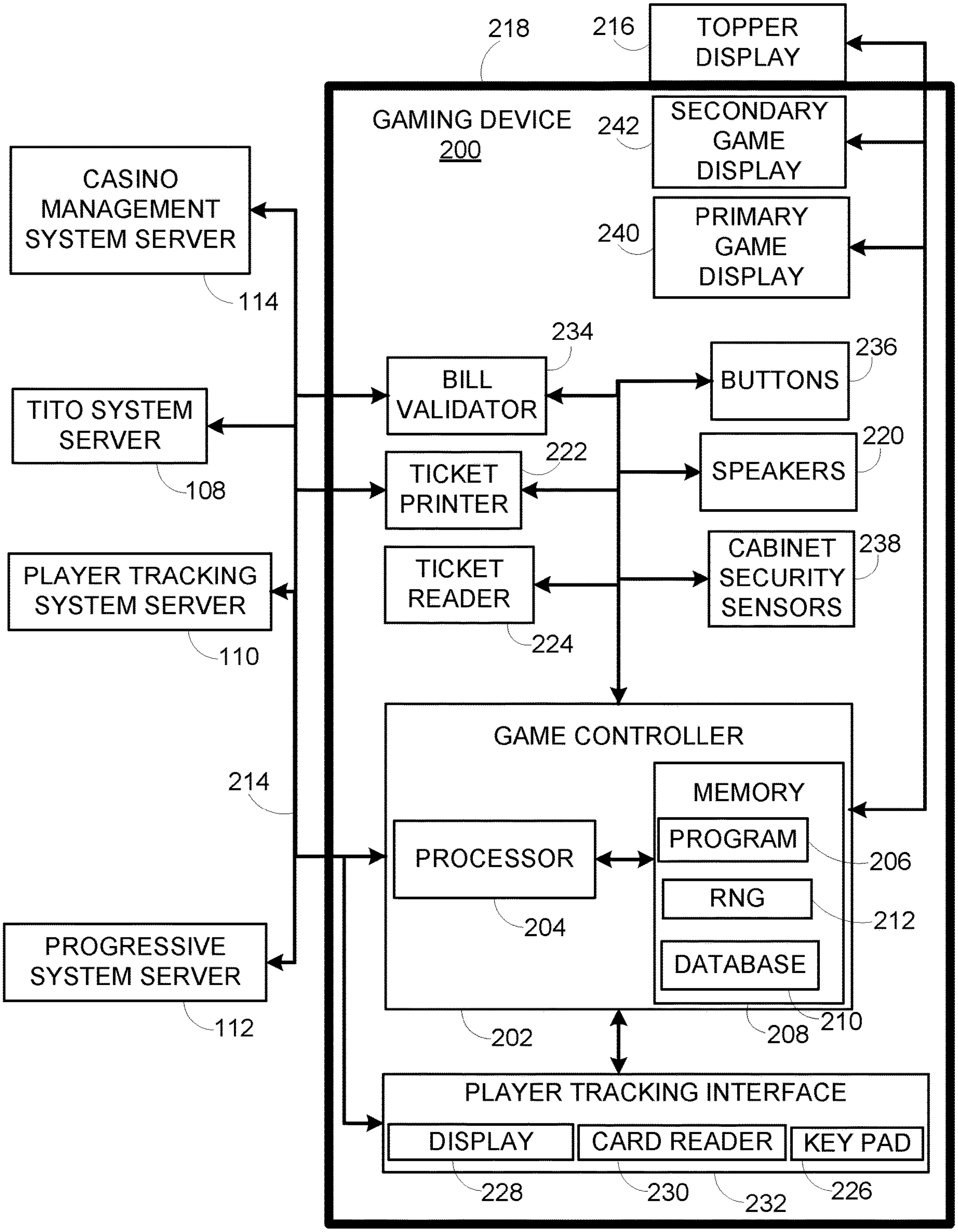
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door (not shown) which opens to provide access to the interior of the gaming device 104B. The main or service door (not shown) is typically used by service personnel to refill the ticket-out printer 126 and collect bills and tickets inserted into the bill validator 124. The main or service door (not shown) may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment.

The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
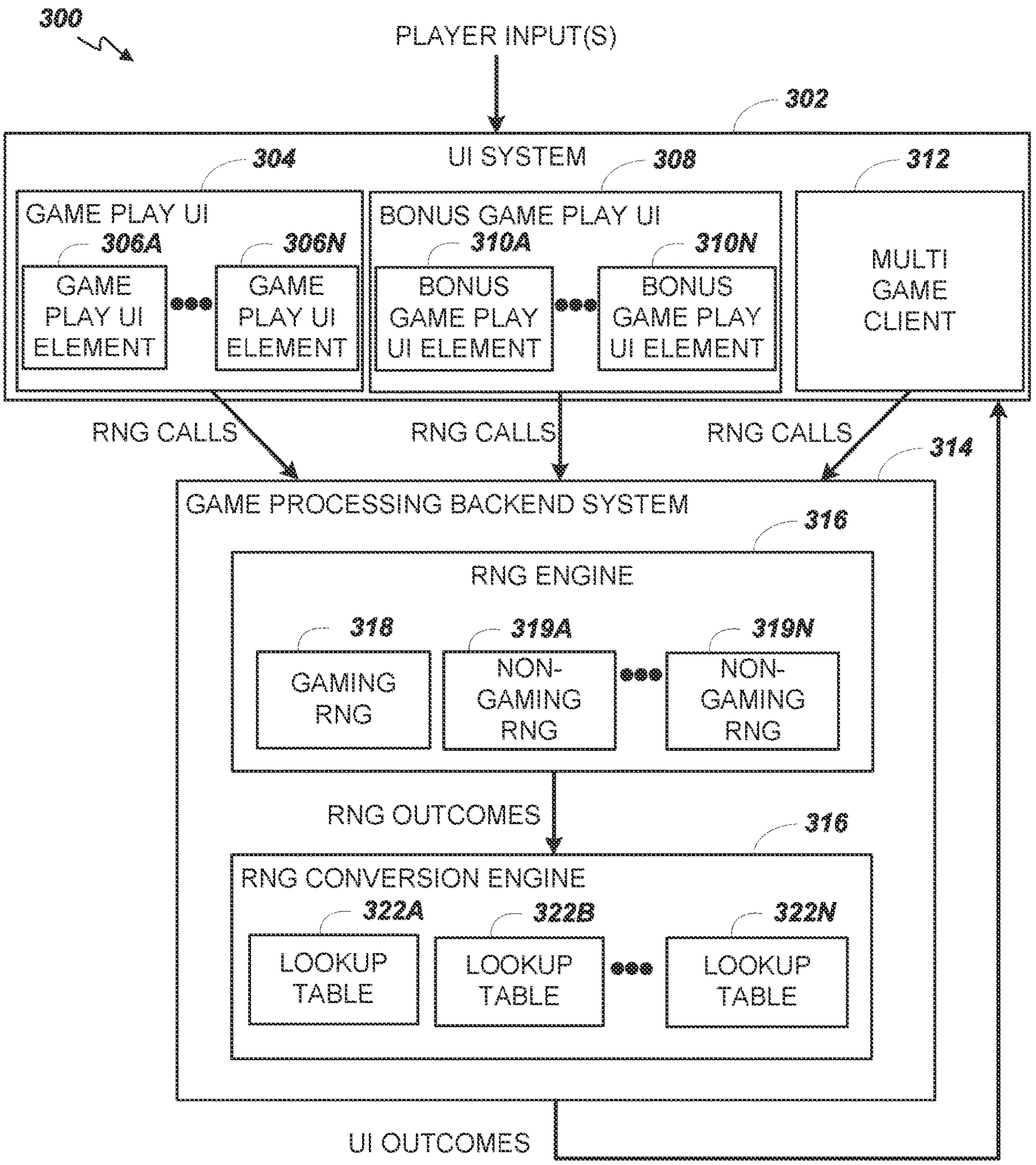
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

FIGS. 4-28 illustrate various configurations of an exemplary modular EGM in accordance with various embodiments described herein.

Figure 4:
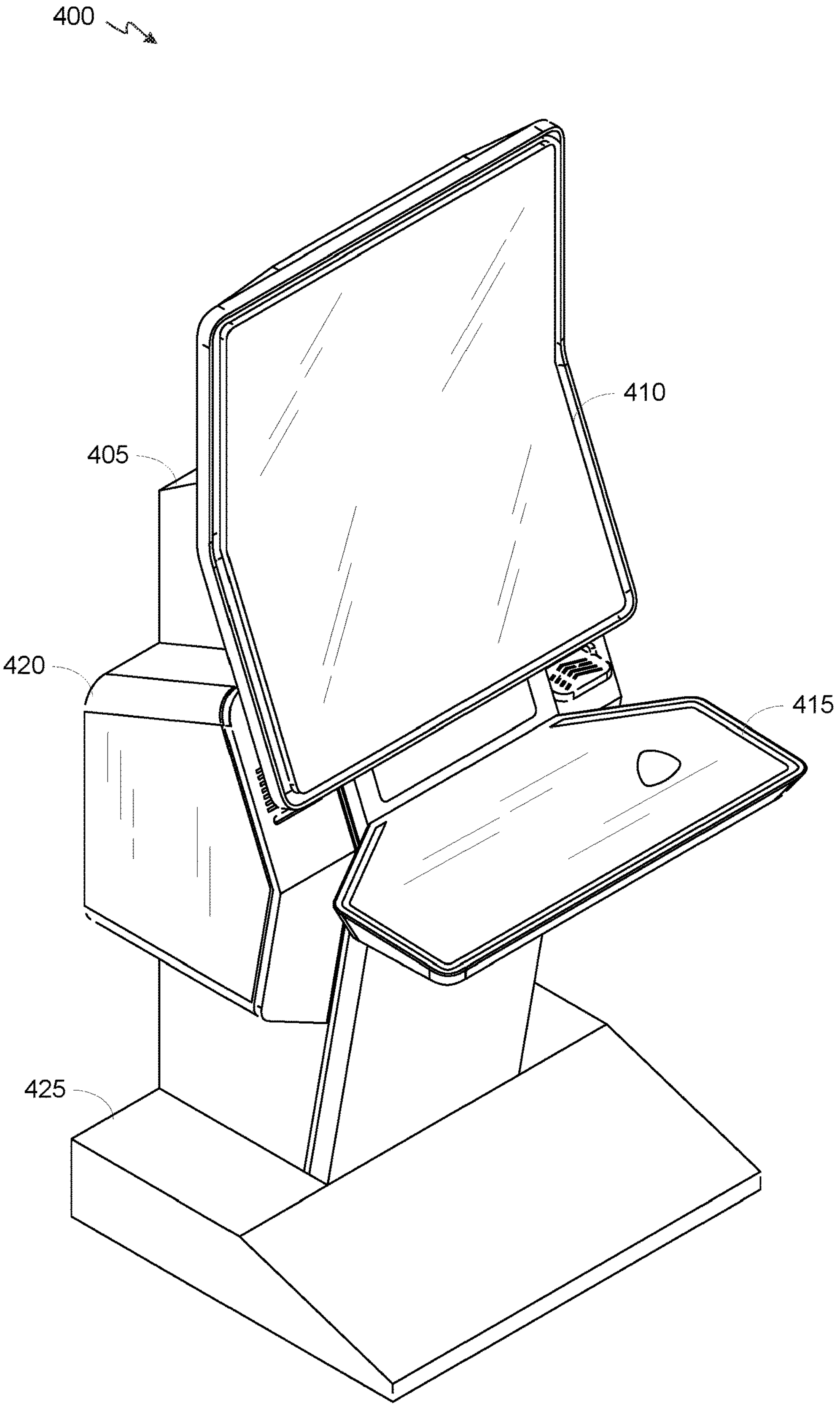
FIGS. 4-28 illustrate various configurations of an exemplary modular EGM in accordance with various embodiments described herein.

FIG. 4 illustrates an exemplary modular EGM 400. In the exemplary embodiment, modular EGM 400 is a variation of gaming devices 104A-104X (shown in FIG. 1) and gaming device 200 (shown in FIG. 2). In the exemplary embodiment, modular EMG 400 includes a structural core 405. The structural core 405 includes a plurality of electronics, such as game controller 202 (shown in FIG. 2) and a plurality of coupling mechanisms (shown in FIG. 29) that allow modular components and peripheral devices to be attached to and controlled by the structural core 405. For example, as shown in FIG. 4, the structural core 405 is attached to a display screen 410, a button deck 415, and one or more saddlebags 420. In this configuration, the structural core 405 is also attached to a stand 425. In some embodiments, the stand 425 is integrated into the structural core 405. In other embodiments, the stand 425 is a separate and removable device from the structural core 405.

In the exemplary embodiment, display screen 410 may include primary game display 240 and secondary display 242 (both shown in FIG. 2). In some further embodiments, structural core 405 may also support a topper display 216 (shown in FIG. 2), which is also removable.

In the exemplary embodiment, structural core 405 includes a plurality of coupling mechanisms for connecting the structural core 405 to the plurality of removable or swappable peripheral devices. These coupling mechanisms include both structural connections and electrical connections between the structural core 405 and the peripheral. The structural connection is configured to support the weight and secure the attached peripheral. The electrical connection is configured to allow the structural core 405 to provide electrical power for the peripheral device as well as provide communications to provide control instructions to the attached peripheral device and to receive information from the attached device. For example, when attaching one or more peripheral display screens 410, the coupling mechanism supports the weight of the attached display screen 410 and secures the display screen 410 to the structural core 405 so that the display screen 410 may not move. The coupling mechanism also includes an electrical connection to power the display screen 410 and provide display instructions from the game controller 202 to the display screen 410. If the display screen 410 is a touch screen, then the electrical connection will also provide touch inputs from the user to the game controller 202. In some embodiments, the coupling mechanisms may include the capability to support cover plates to protect unused coupling mechanisms. These coverplates and faceplates may be decorative panels and integrated into the design and configuration of the corresponding EGM. In other embodiments, the coupling mechanism may include a locking mechanism or other mechanism to determine when an authorized peripheral is attached. In some further embodiments, the structural core 405 may configured to not provide power and/or communications with a coupling mechanism unless the authorized peripheral is attached.

In the exemplary embodiment, the modular EGM 400 is configured to allow devices to be added and removed as needed for the desired device configuration. The devices may be attached to structural supports that include coupling mechanisms. In some embodiments, the coupling mechanisms include guide pins to allow the structural supports and devices to line up precisely. This helps to support the electrical connections that may be contained in the coupling mechanisms. In some embodiments, the structural supports contain internal wiring to prevent unsightly wires. This internal wiring allows devices to be powered. In some embodiments, the internal wiring allows the various devices attached to the structural supports to communicate with each other. In some embodiments, the coupling mechanisms may include, but are not limited to, snap fit connectors and keyhole fasteners.

In the exemplary embodiment, the structural supports include electrical connectors that are integrated into the coupling mechanisms so that the devices may make electrical connections with the structural supports. In some embodiments, the electrical connectors, or electrical contacts, are spring loaded on at least one side to create a bias to ensure that a connection is made when coupled.

In some embodiments, one or both of connecting coupling mechanisms may include a rubber seal or rubberized coupling, such that when the two parts of the coupling mechanism are pushed together they create a seal around any potential electrical contact point. In some further embodiments, there may be sleeves that extend from one side of the coupling mechanism to protect the connection and to guide the two parts together.

In some embodiments, the coupling mechanism includes one or more locking mechanisms to secure the coupling and create a structural integrity between structural supports and between the structural supports and the attached devices.

In the exemplary embodiment, the button deck 415 is similar to the buttons 236 (shown in FIG. 2). The structural core 405 provides power to and control information back and forth with the button deck 415. This allows the button deck 415 to be swapped out based on the configuration of the modular EMG 400. In some embodiments, the structural core 405 also supports the removal of the button deck 415 and having the corresponding coupling mechanism to be covered by a cover plate.

In the exemplary embodiment, the one or more saddlebags 420 are replaceable. In some embodiments, the saddlebags 420 may include one or more of the player tracking interface 232, the ticket printer 222, the ticket reader 224, the bill validator 234, and speakers 220 (all shown in FIG. 2). In the exemplary embodiment, these various peripheral devices are all controlled by the game controller 202 in the structural core 405. In the exemplary embodiment, the saddlebags 420 may be replaced by other saddlebags 420 with different functionality. For example, saddlebags 420 containing ticket reading and printing equipment may be replaced with superior speakers and/or subwoofers based on the desired configuration of the modular EGM 400. In other examples, the saddlebags 420 may contain equipment for generating plastic magnetic strip cards, such as loyalty program cards, and/or paper magnetic strip tickets, such as ticket vouchers.

In the exemplary embodiment, the stand 425 of modular EGM 400 is replaceable. In these embodiments, a first stand 425 may allow for the modular EGM 400 to be presented at a height where an average player would stand to interact with the modular EGM 400. A second stand 425 may allow for the modular EGM 400 to be presented at a height where an average player would sit in a chair or a stool to interact with the modular EGM 400. In embodiments, the stand 425 would be interchangeable to allow the modular EGM 400 to be presented at different heights to allow it to be placed on objects such as ledges, pedestals, and/or table tops. In some embodiments, the stand may include wiring and/or plugs to allow the structural core 405 to be attached to external power sources and/or networking communication with one or more remote servers 106-114 (shown in FIG. 1).

The modular EGM 400 described herein allows for multiple parts of the modular EGM 400 to be removed and/or swapped out to support different configurations. In the exemplary embodiment, the modular EGMs 400 shown herein support swapping out devices, such as, but not limited to displays 410, button decks 415, saddlebags 420, speakers, stands 425, and chair couplings. By doing so, the central internal components of the EGM 400 may stay the same with one or more external components being capable of being swapped out.

The modular EGM 400 can be converted into a gaming machine, a kiosk, or a dual machine with a large display. The side saddlebags 420 may contain or be replaced with premium speakers. The button deck 415 may be removable with a corresponding cover plate to replace it. The saddlebags 420 may be removable with corresponding cover plates. These coverplates and faceplates may be decorative panels and integrated into the design and configuration of the corresponding EGM. There may also be quick-connect and/or disconnect electrical connections for all removable components as required.

In some embodiments, the modular EGM 400 includes a structural core 405 that includes necessary computing resources to allow the modular EMG 400 to control the swappable peripheral devices that may be plugged into the structural core 405. The structural core 405 may be able to detect which devices are plugged into its various coupling mechanisms to be able to control those devices.

In the exemplary embodiment, an electronic gaming machine (EGM) 400 is built with a structural core 405, also known as a common core, with flexibility to change look and feel by adding or changing key components. The key elements that can change on the cabinet are the monitors or display screens 410, the button deck 415, the saddlebags 420, and the base 425. Other peripherals may be replaceable based on the configuration of the structural core 405.

In some embodiments, the structural core 405 described herein allows for multiple different configurations, such as, but not limited to, an upright (a cabinet that sits on a base), a slant (a cabinet that directly stands on the floor), and a portrait which has a monitor mounted in a portrait orientation that can go on both an upright or slant base. In addition, the modular device supports peripheral devices such as bill validators and printers that can be added/removed from the structural core 405 if such elements are not needed as in the case of a "cashless" casino. In the exemplary embodiment, the cabinet can be changed from a slant to an upright or have peripherals added or removed or button deck area 415 completely changed in dimensional size.

Figure 5:
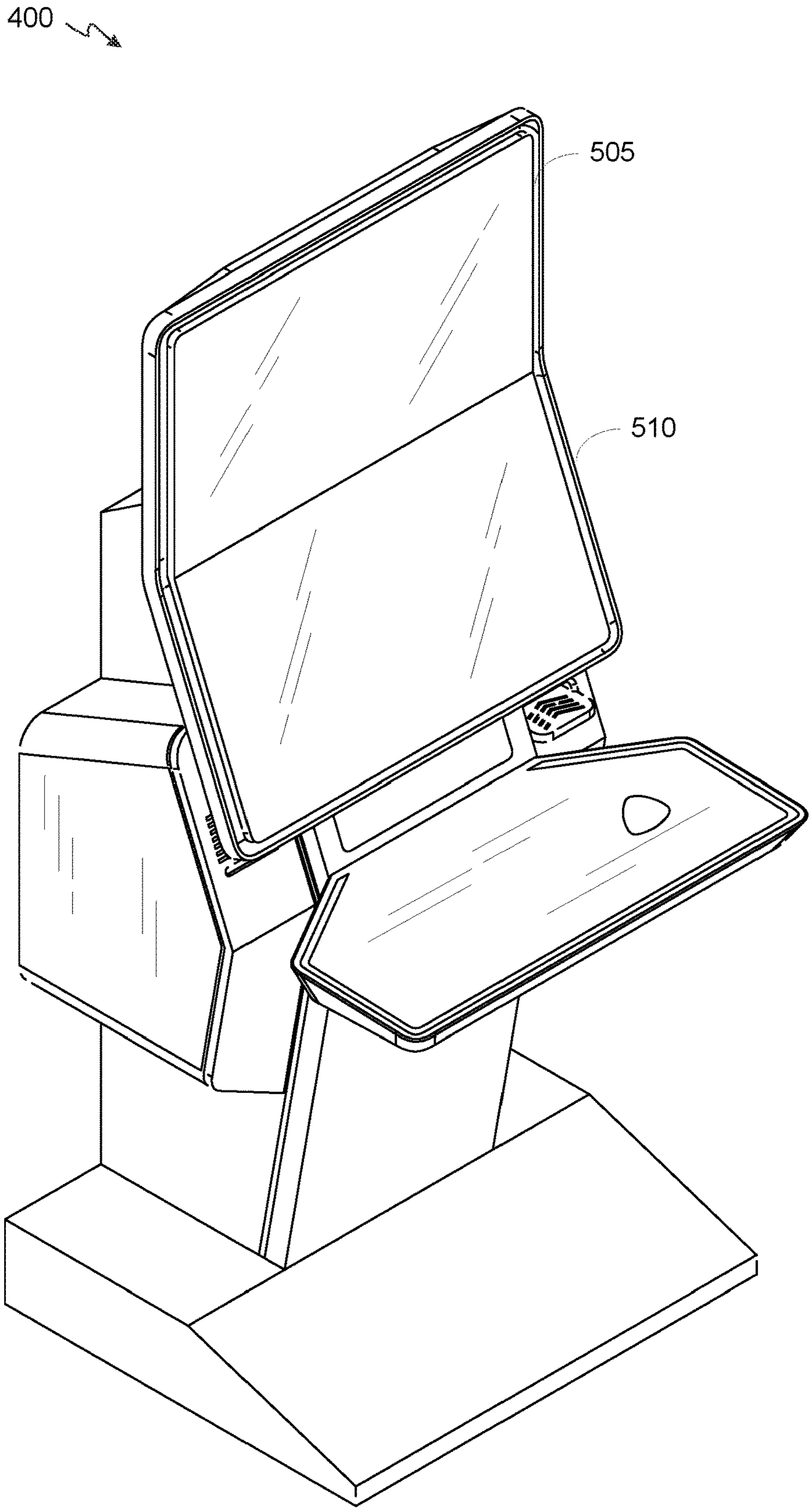
Figure 6:
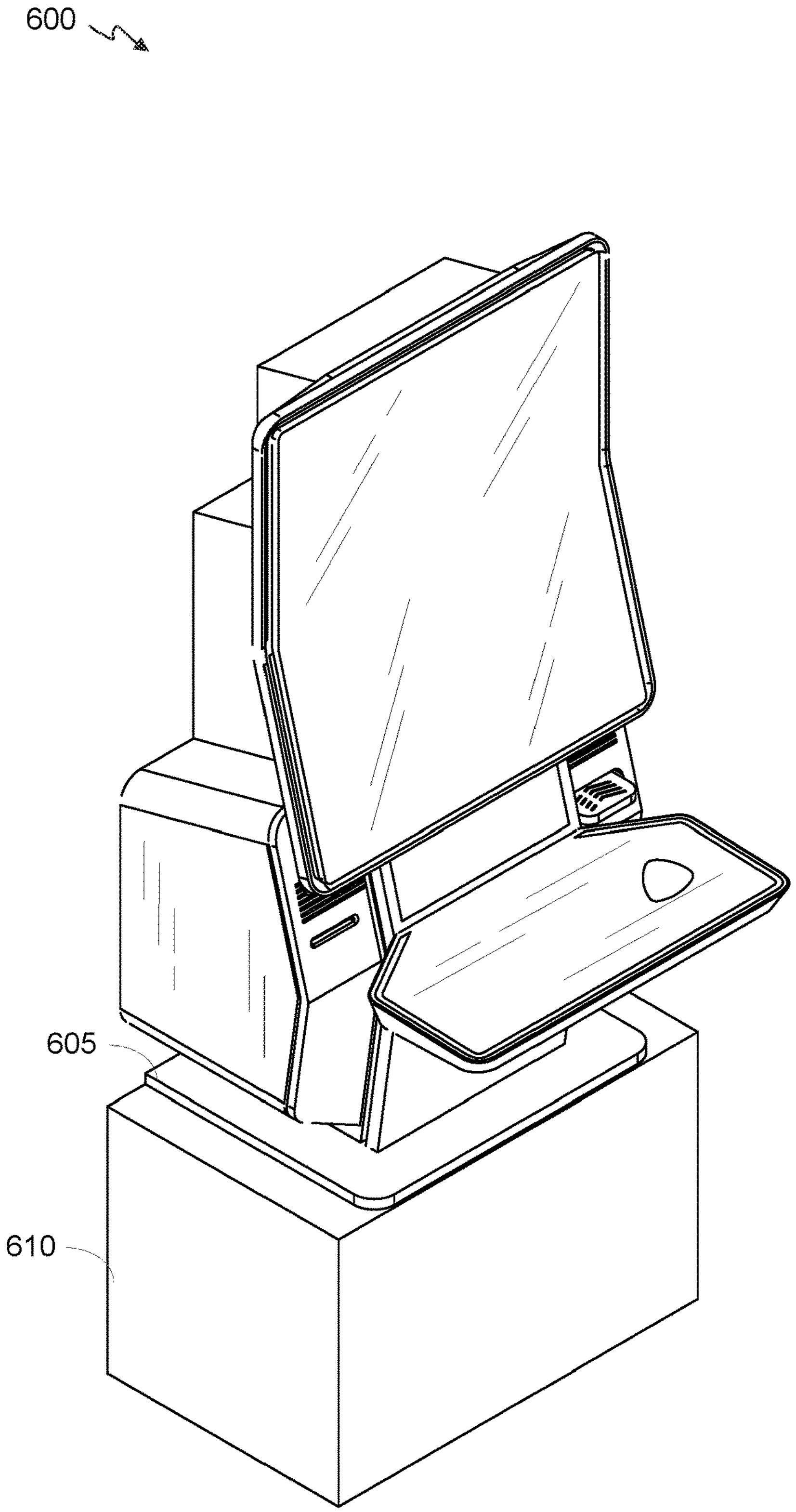
Figure 7:
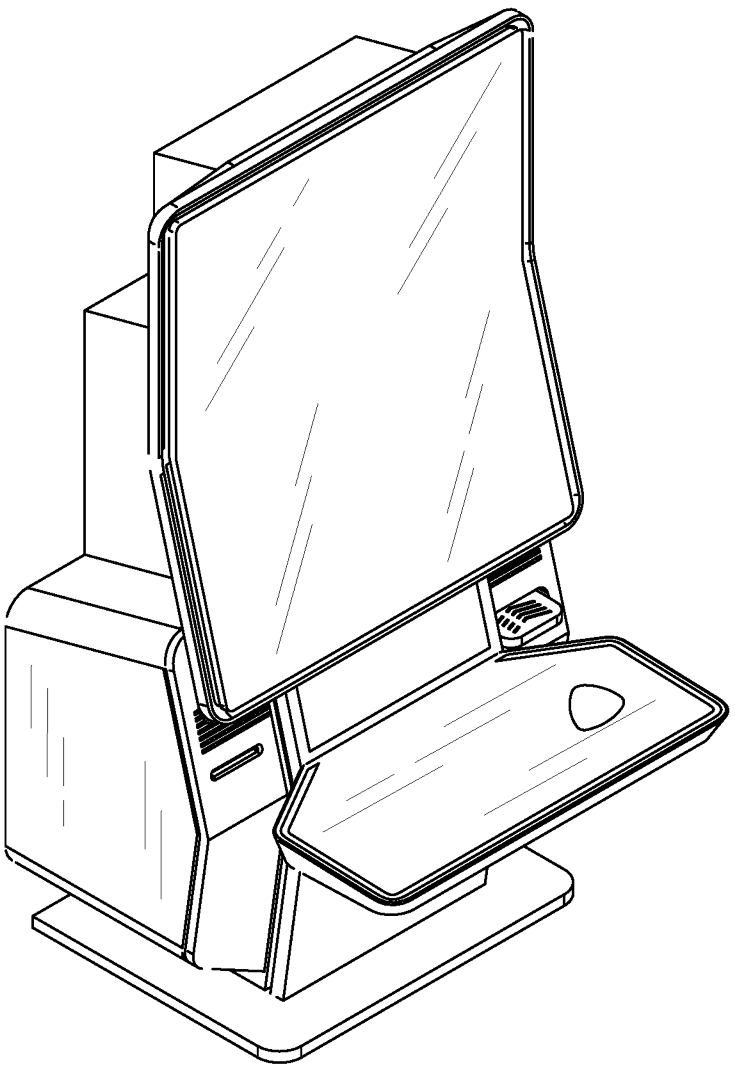

FIG. 4 shows a first configuration of a modular EGM 400. FIG. 5 shows a variation on the modular EGM 400 shown in FIG. 4, where the single display screen 410 (shown in FIG. 4) has been replaced with two screens 505 and 510. As different screen technologies become available, the display screens may be swapped out for different styles, models, etc. FIG. 6 shows another variation 600 on the modular EGM 400 shown in FIG. 4, where the stand 425 (shown in FIG. 4) has been replaced with a much shorter stand 605, so that the modular EGM 400 may be placed on a pedestal or ledge 610. In some embodiments, the two different stand types represent different bases that are available to be changed for the modular EGM 400. These may also represent two different styles of devices that may be customized with modular devices. FIG. 7 shows the shorter modular EGM 600 (shown in FIG. 6) without the pedestal 610 (shown in FIG. 6). In some embodiments, the pedestal 610 is a part of the modular EGM 400, in other embodiments, the pedestal 610 is separate from the modular EGM.

Figure 8:
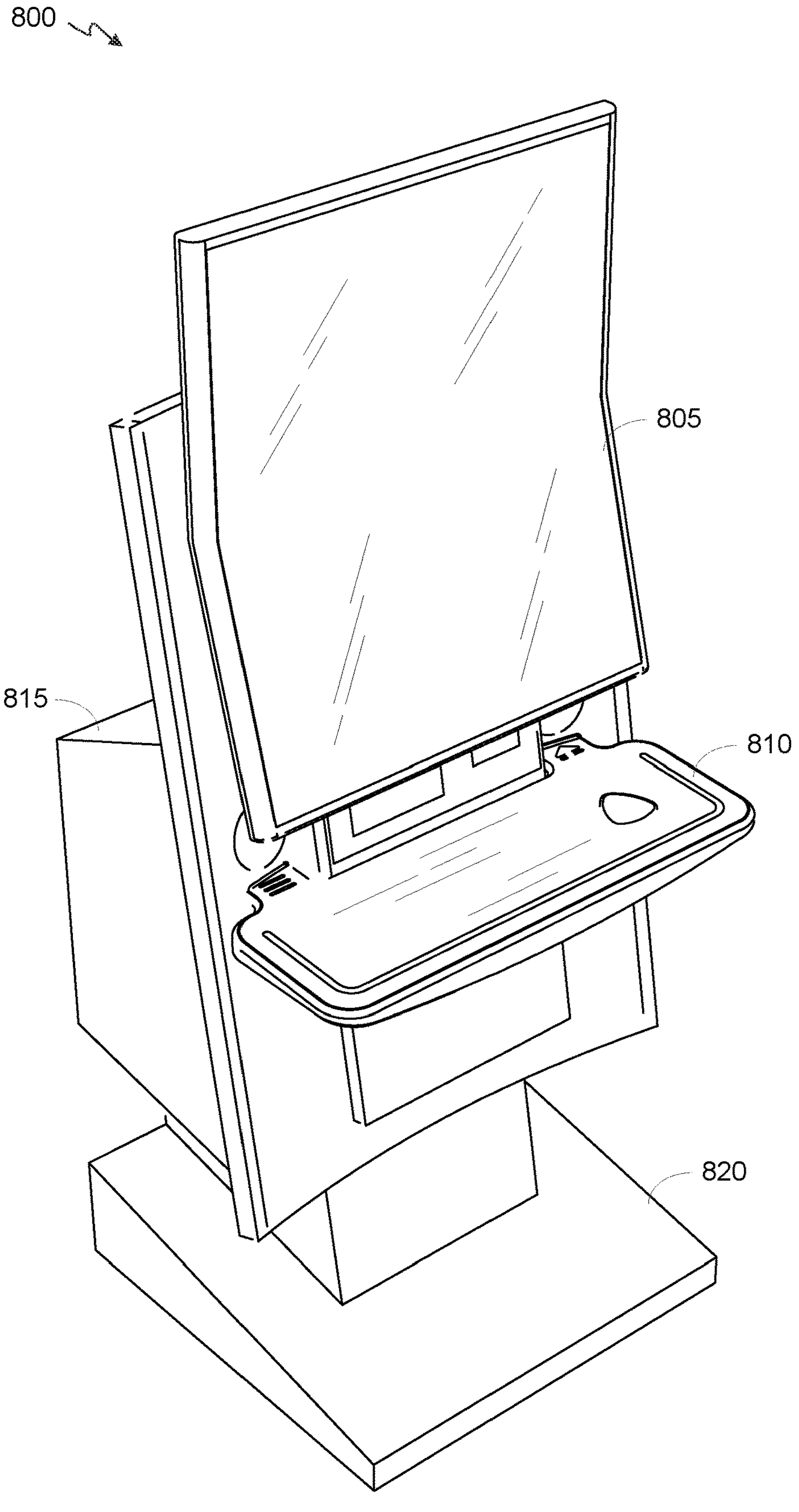
Figure 9:
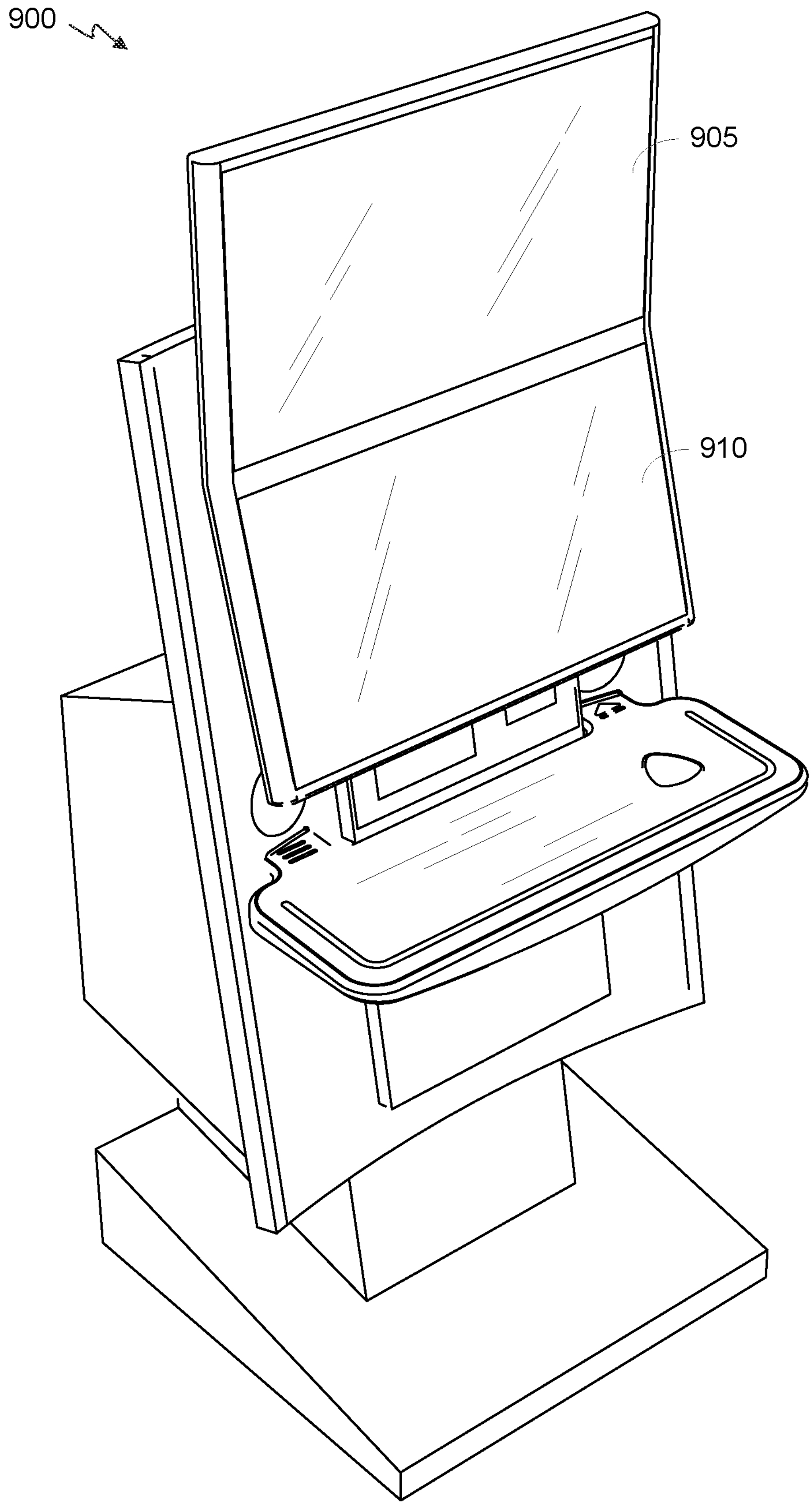
Figure 10:
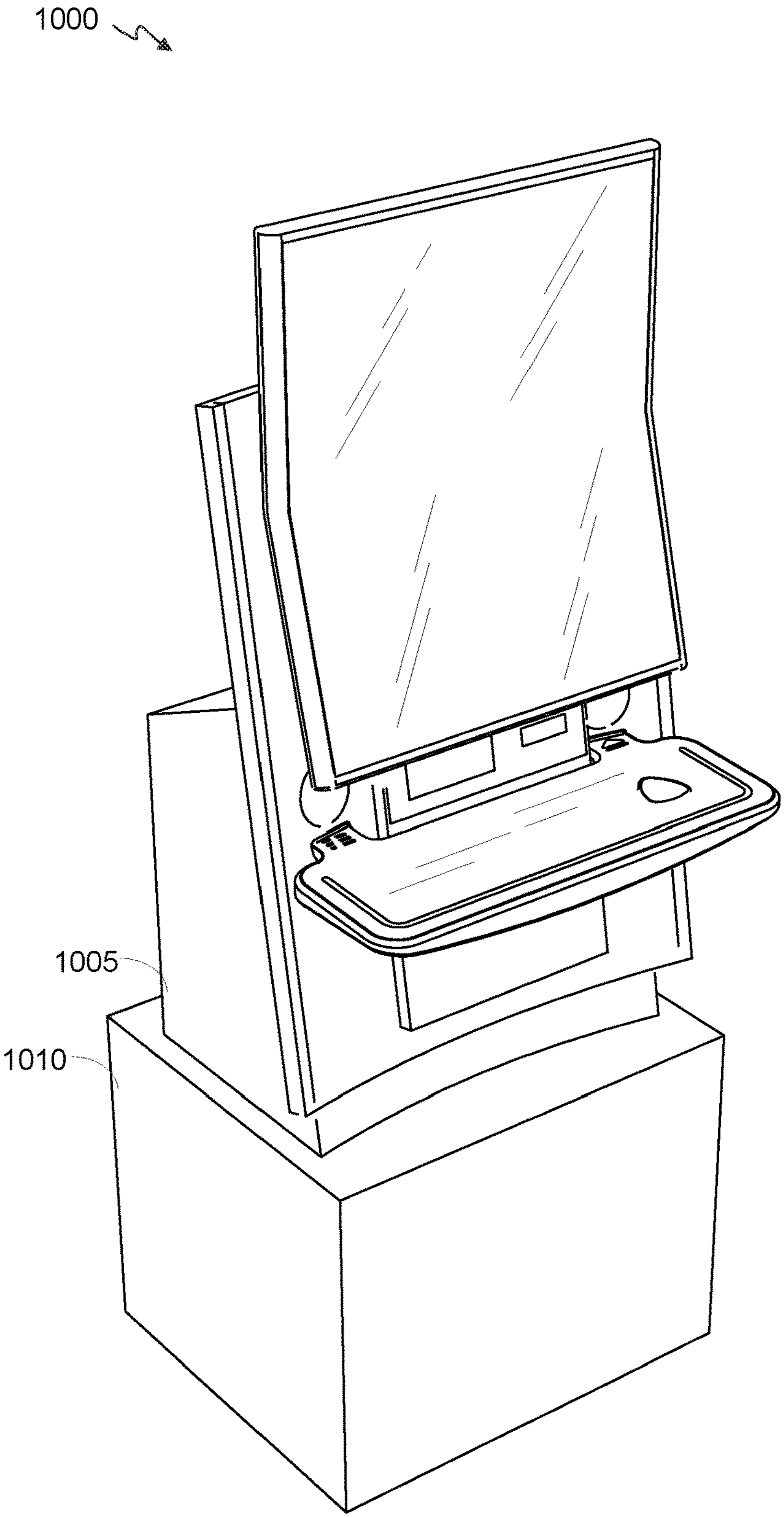

FIG. 8 shows a second configuration 800 of a modular EGM including a single screen 805, a button area 810, saddlebags 815, and a slant base 820. FIG. 9 shows a variant configuration 900 on the modular EGM 800 shown in FIG. 8, where the single screen 805 (shown in FIG. 1) has been replaced with two screens 905 and 910. As different screen technologies become available, the screens may be swapped out for different styles, models, etc. FIG. 10 shows another variant configuration 1000 of the modular EGM 800 shown in FIG. 8, where the stand 820 (shown in FIG. 8) has been replaced with a much shorter stand 1005, so that the EGM 1000 may be placed on a pedestal or ledge 1010. In some embodiments, the two different stand types represent different bases that are available to be changed for the modular EGM 100. These may also represent two different styles of devices that may be customized with modular devices. In some embodiment, the pedestal is a part of the modular EGM 1000, in other embodiments, the pedestal is separate from the modular EGM 1000.

Figure 11:
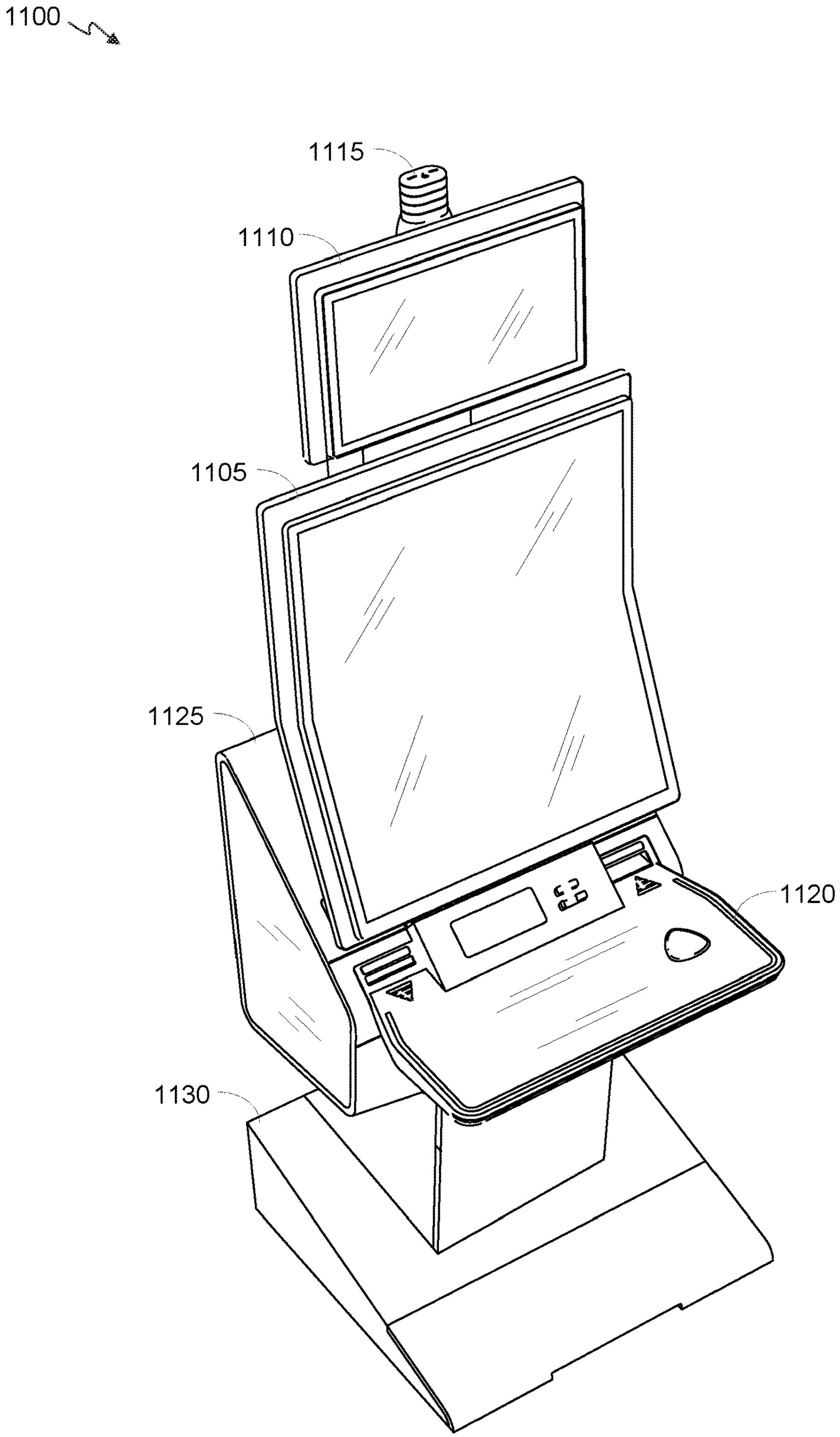

FIG. 11 shows a third configuration 1100 of a modular EGM, including a first screen 1105, topper display 1110, a candle 1115, a button area 1120, saddlebags 1125, and a slant base 1130. Topper display 1110 may be similar to optional topper screen 140 (shown in FIG. 1) and topper display 216 (shown in FIG. 2). Candle 115 may be similar to candle 138 (shown in FIG. 1).

Figure 12:
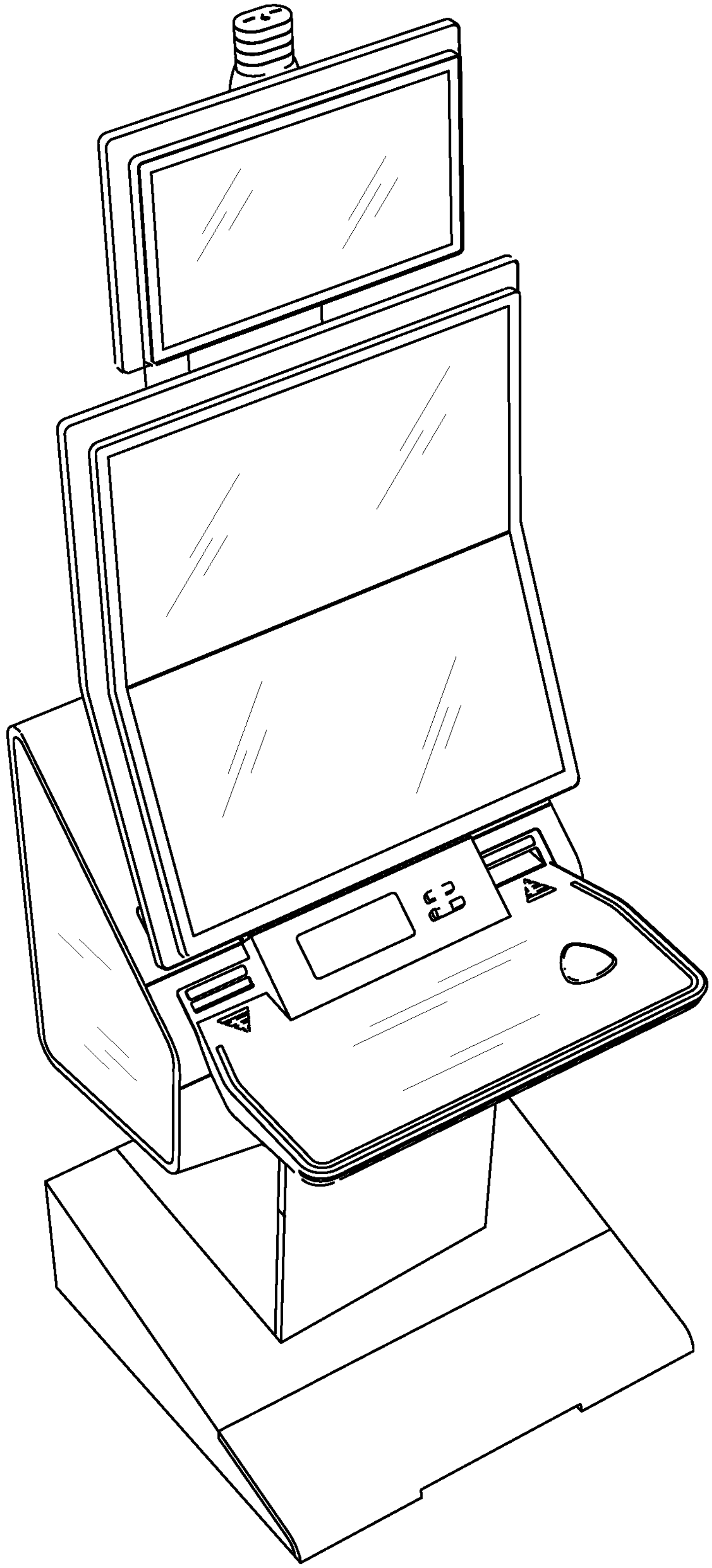
Figure 13:
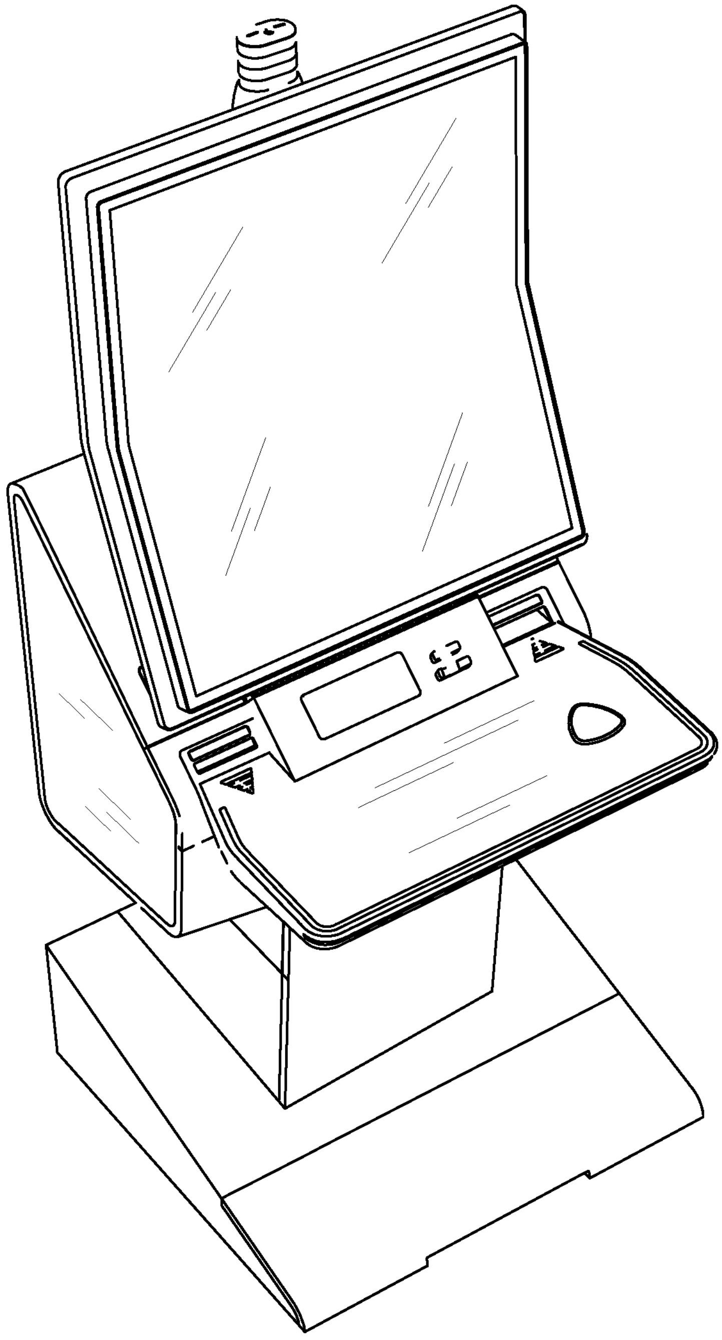
Figure 14:
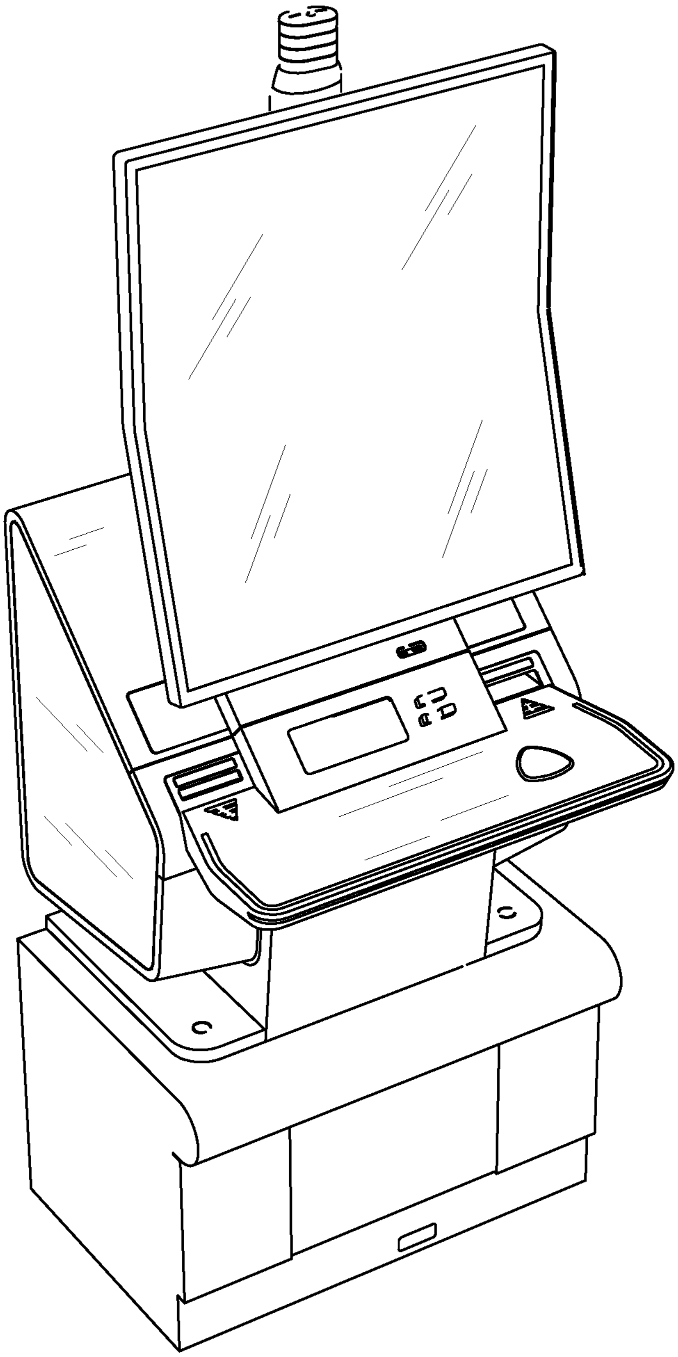

FIG. 12 shows a variant configuration on the modular electronic gaming device shown in FIG. 11, where the single screen 1105 (shown in FIG. 11) has been replaced with two screens. As different screen technologies become available, the screens may be swapped out for different styles, models, etc. FIG. 13 shows another variation on the modular electronic gaming device shown in FIG. 11, where the topper screen 1110 (shown in FIG. 11) has been removed and the candle 1115 (shown in FIG. 11) at the top of the modular EGM has been moved down to just over the first screen 1105 (shown in FIG. 11). FIG. 14 shows a further variation based on FIG. 13, wherein the tall stand has been replaced with a much shorter stand, so that the device may be placed on a pedestal or ledge.

Figure 15:
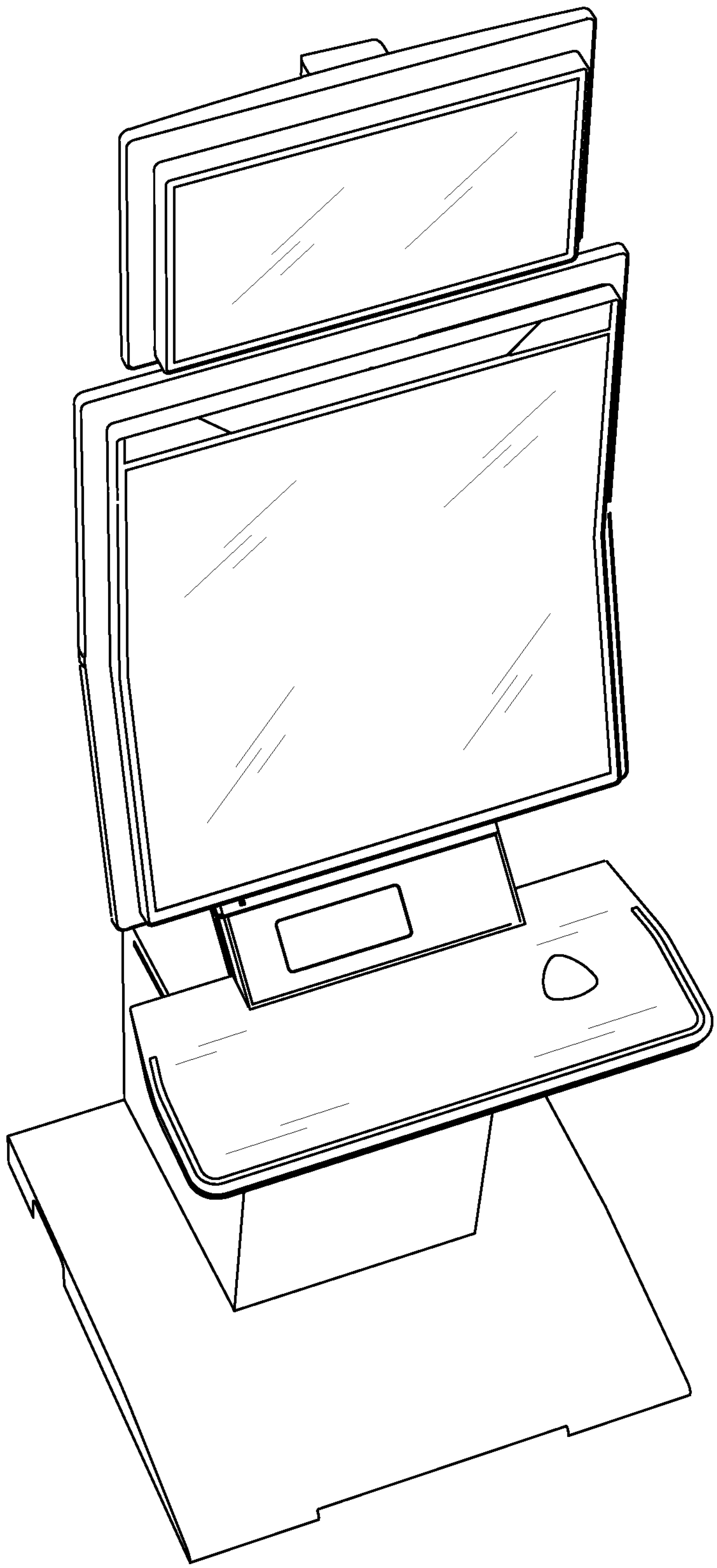
Figure 16:
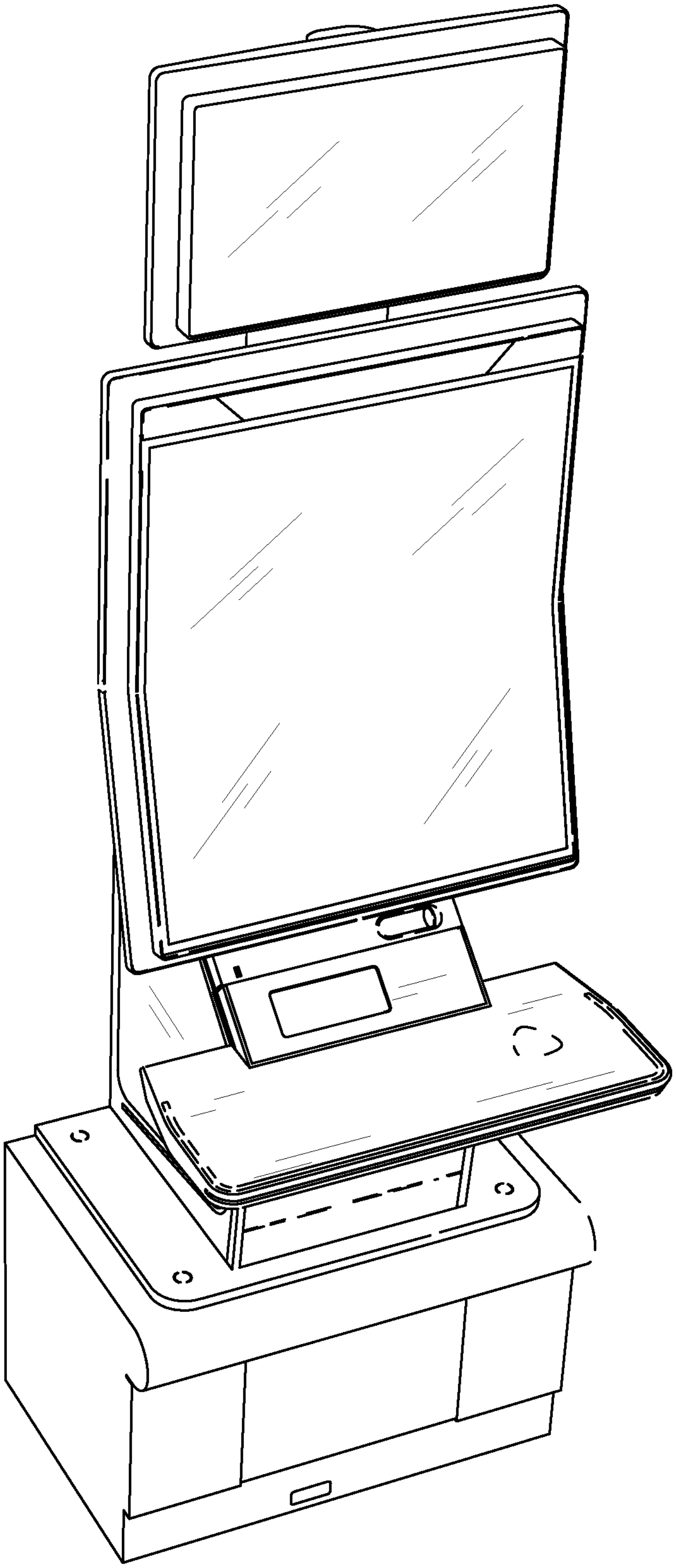

FIG. 15 shows a variation of the modular electronic EGM 1100 (shown in FIG. 11) where the saddlebags 1125 (shown in FIG. 11) have been removed. In some embodiments, the saddlebags 1125 contain the bill acceptor, ticket printers, speakers, subwoofers, or other accessory style devices. In other embodiments, the saddlebags 1125 may contain paper printers for printing out tickets. In still other embodiments, the saddlebags 1125 may contain the capability of generating plastic magnetic strip cards, such as loyalty program cards. FIG. 16 shows another variation on the modular EGM shown in FIG. 15, where the stand has been replaced with a much shorter stand, so that the device may be placed on a pedestal or ledge. In some embodiments, the two different stand types represent different bases that are available to be changed for the modular EGM. These may also represent two different styles of devices that may be customized with modular devices. In some embodiment, the pedestal is a part of the modular EGM, in other embodiments, the pedestal is separate from the modular EGM.

Figure 17:
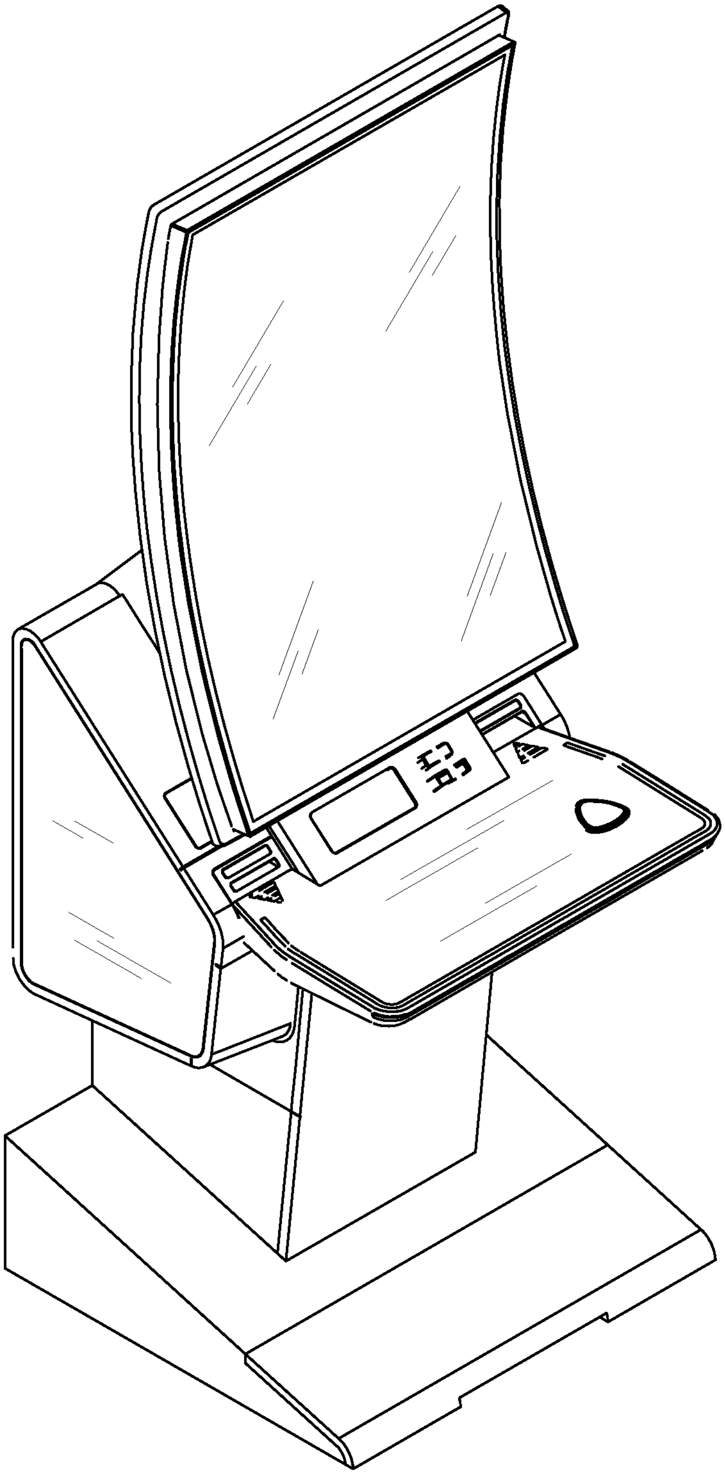
Figure 18:
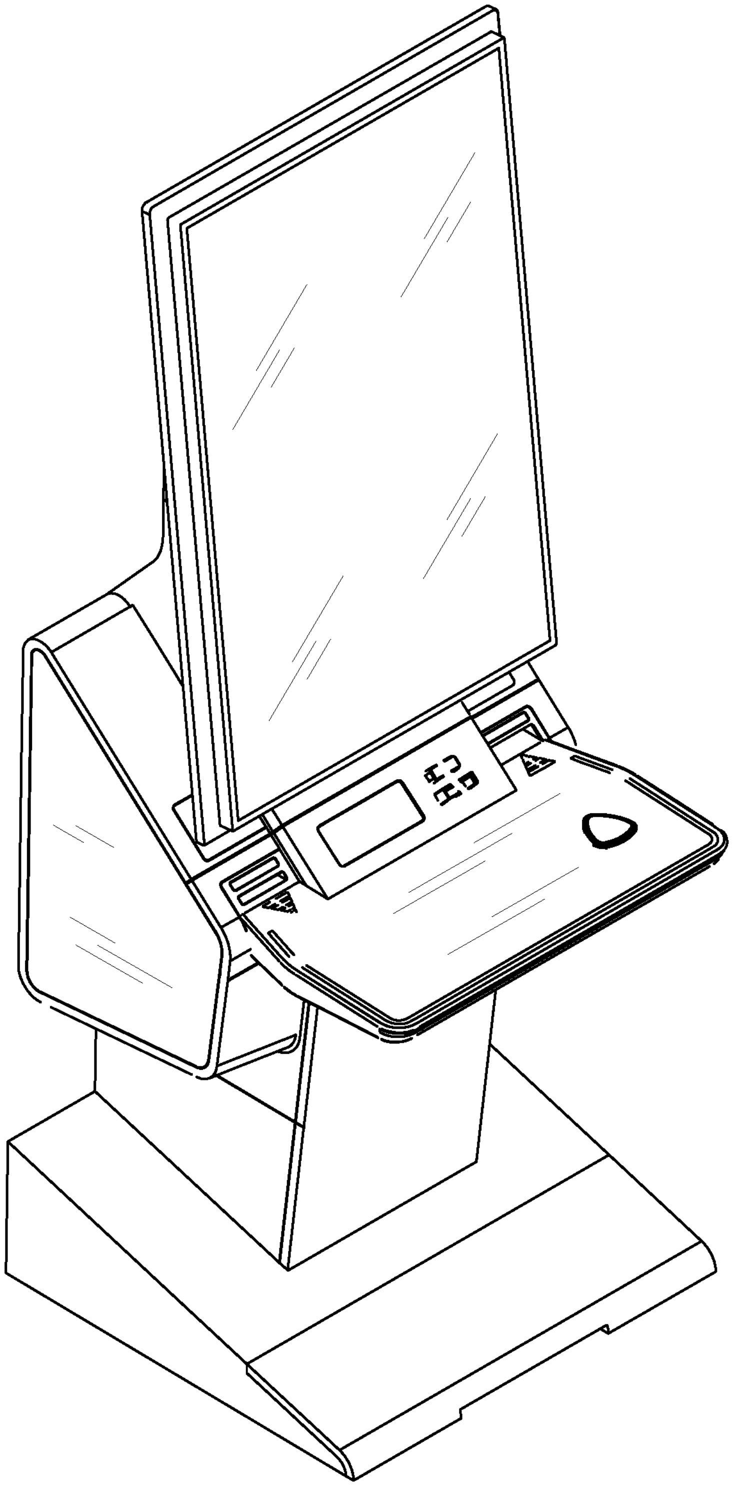
Figure 19:
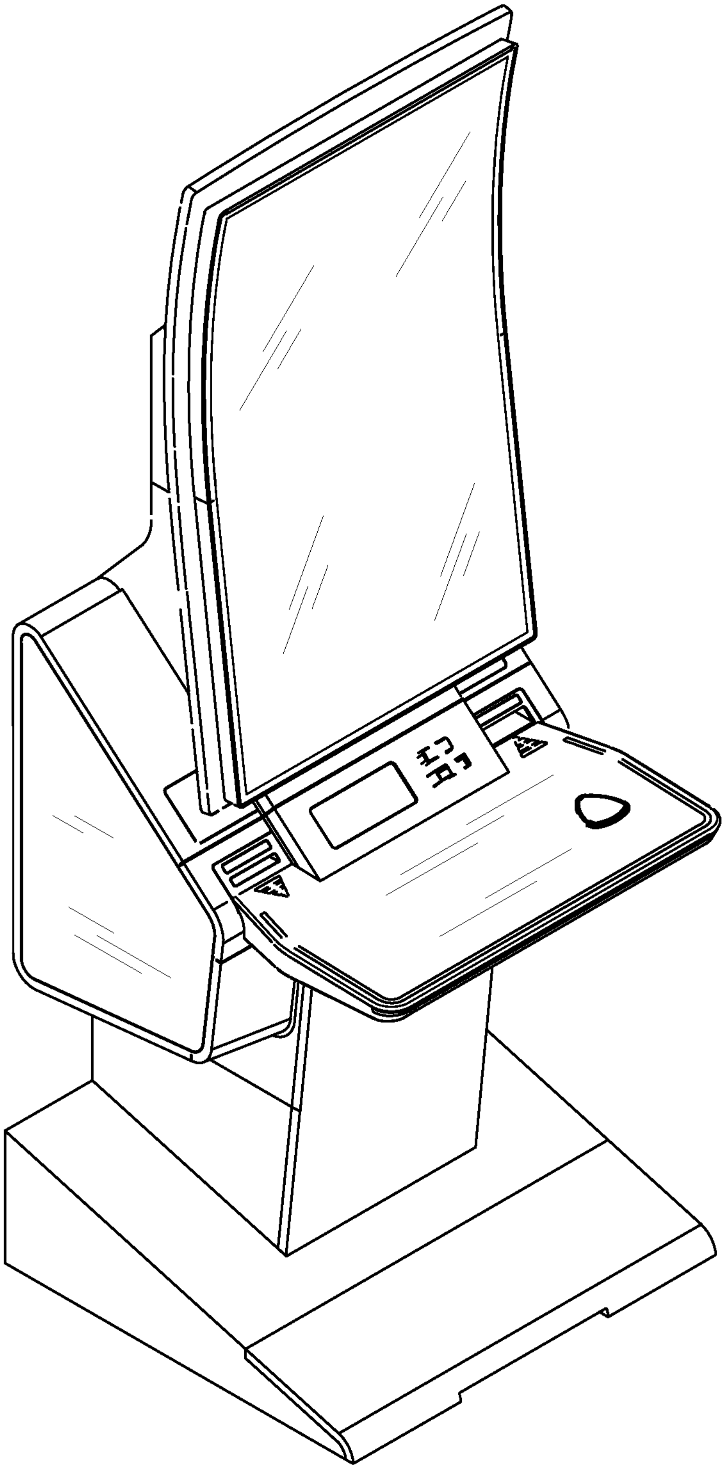
Figure 20:
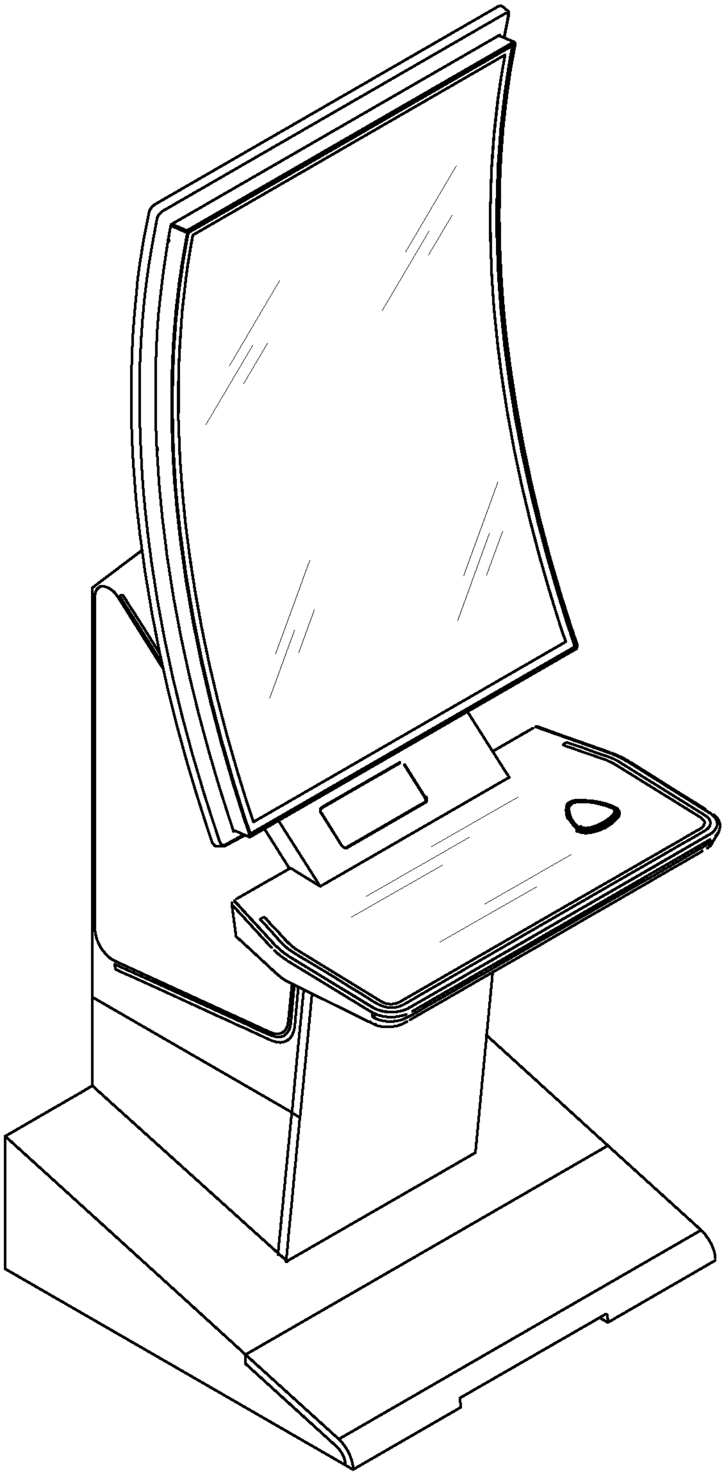

FIG. 17 shows a variation on the modular EGM shown in FIG. 13, where the screen 1105 has been replaced with a C-curve screen. FIG. 18 shows a variation on the modular EGM shown in FIG. 13, where the screen 1105 has been replaced with a flat screen. FIG. 19 shows a variation on the modular EGM shown in FIG. 13, where the screen 1105 has been replaced with a P-curve screen. FIG. 20 shows a variation of the modular EGM shown in FIG. 17 where the saddlebags 1125 have been removed and saddlebag covers have been put in their place.

Figure 21:
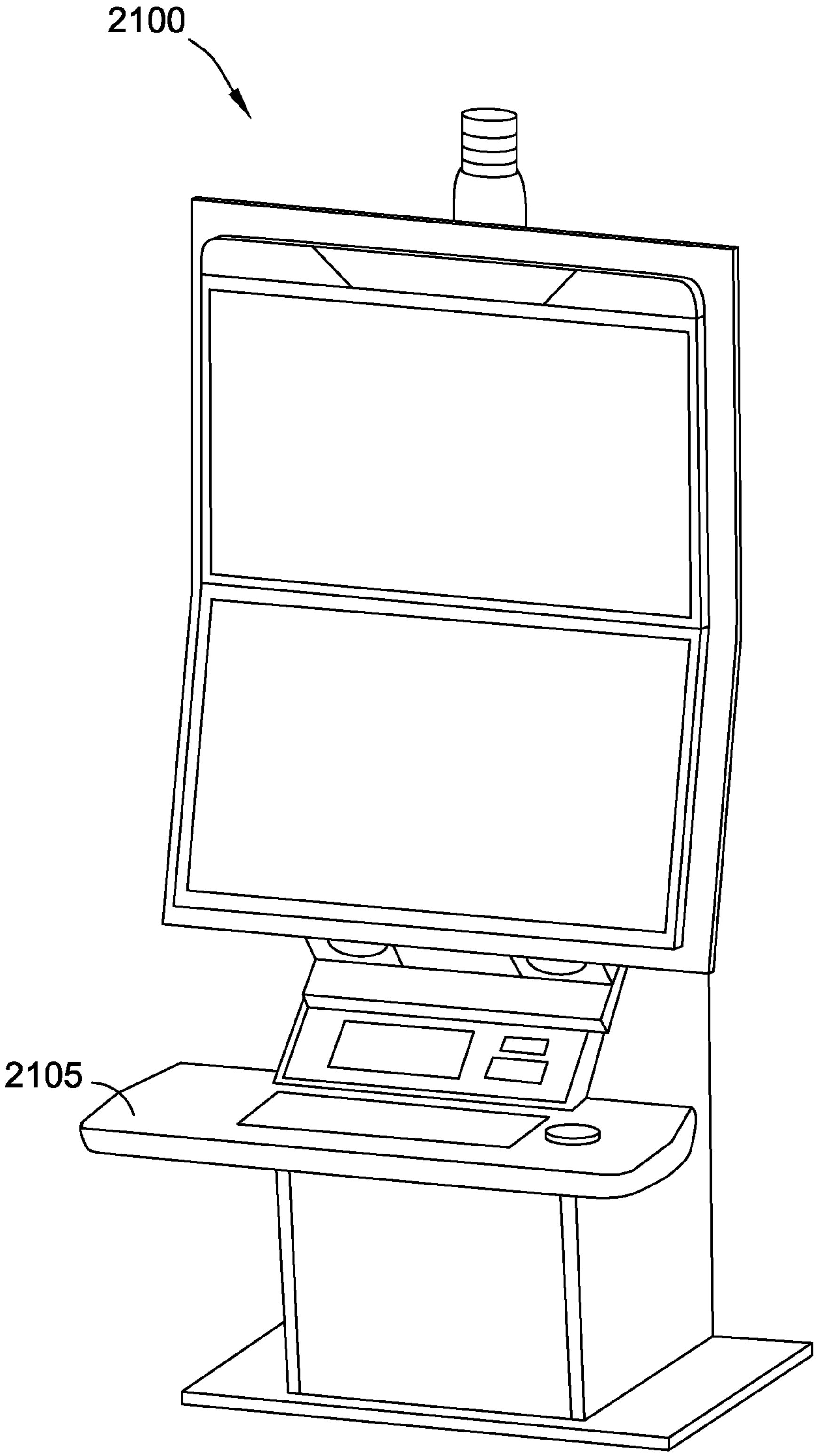
Figure 22:
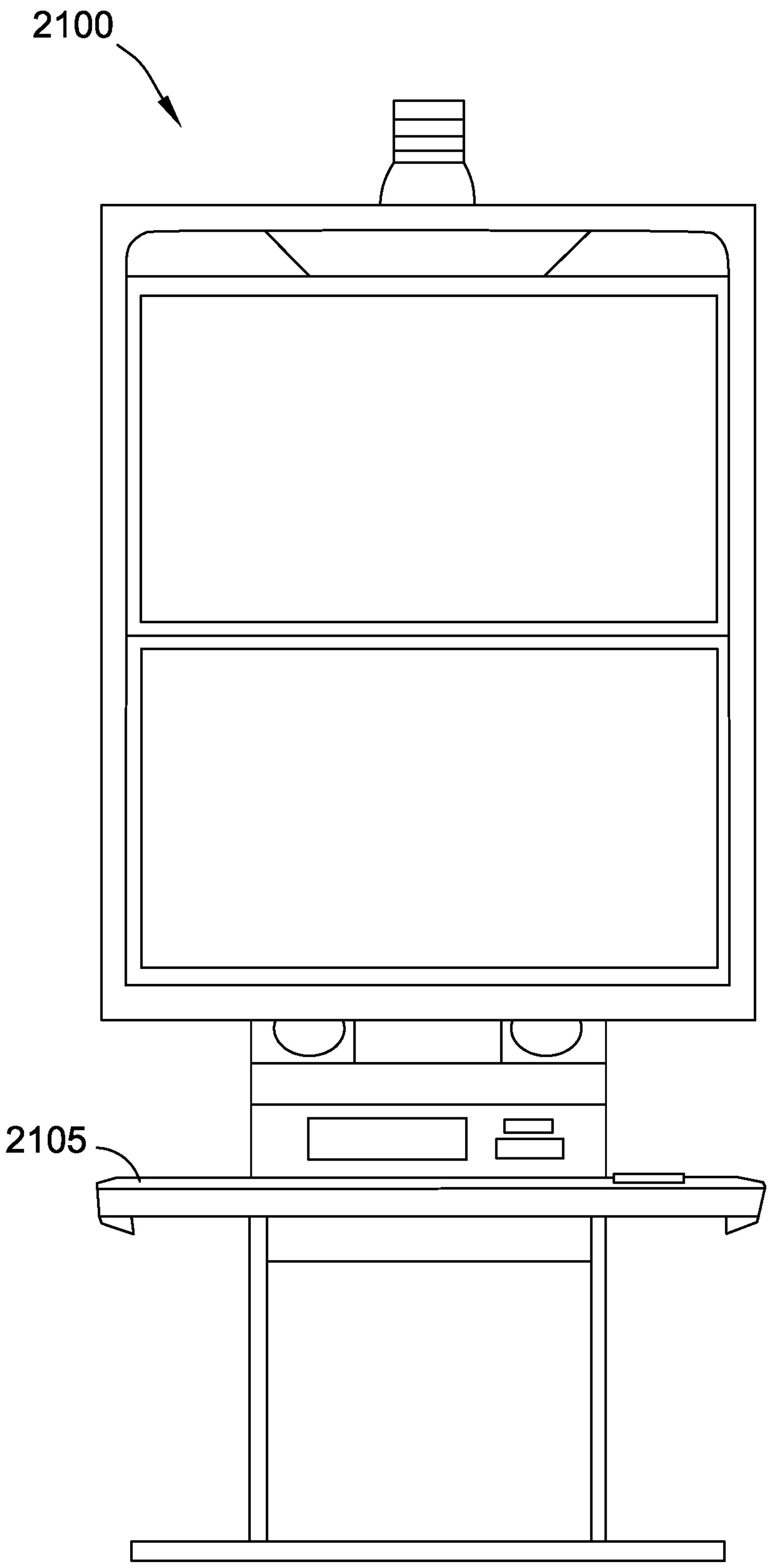
Figure 23:
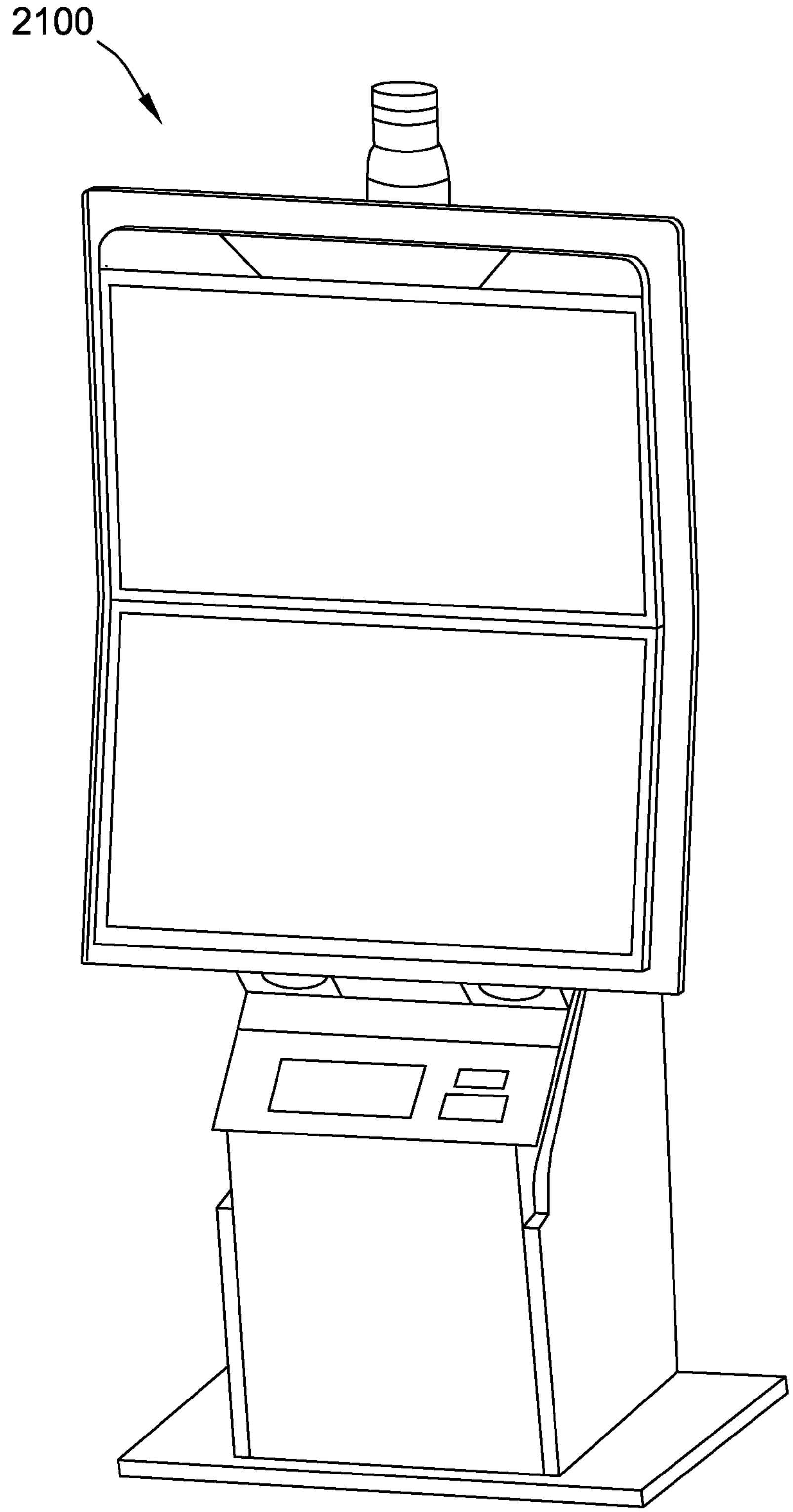
Figure 24:
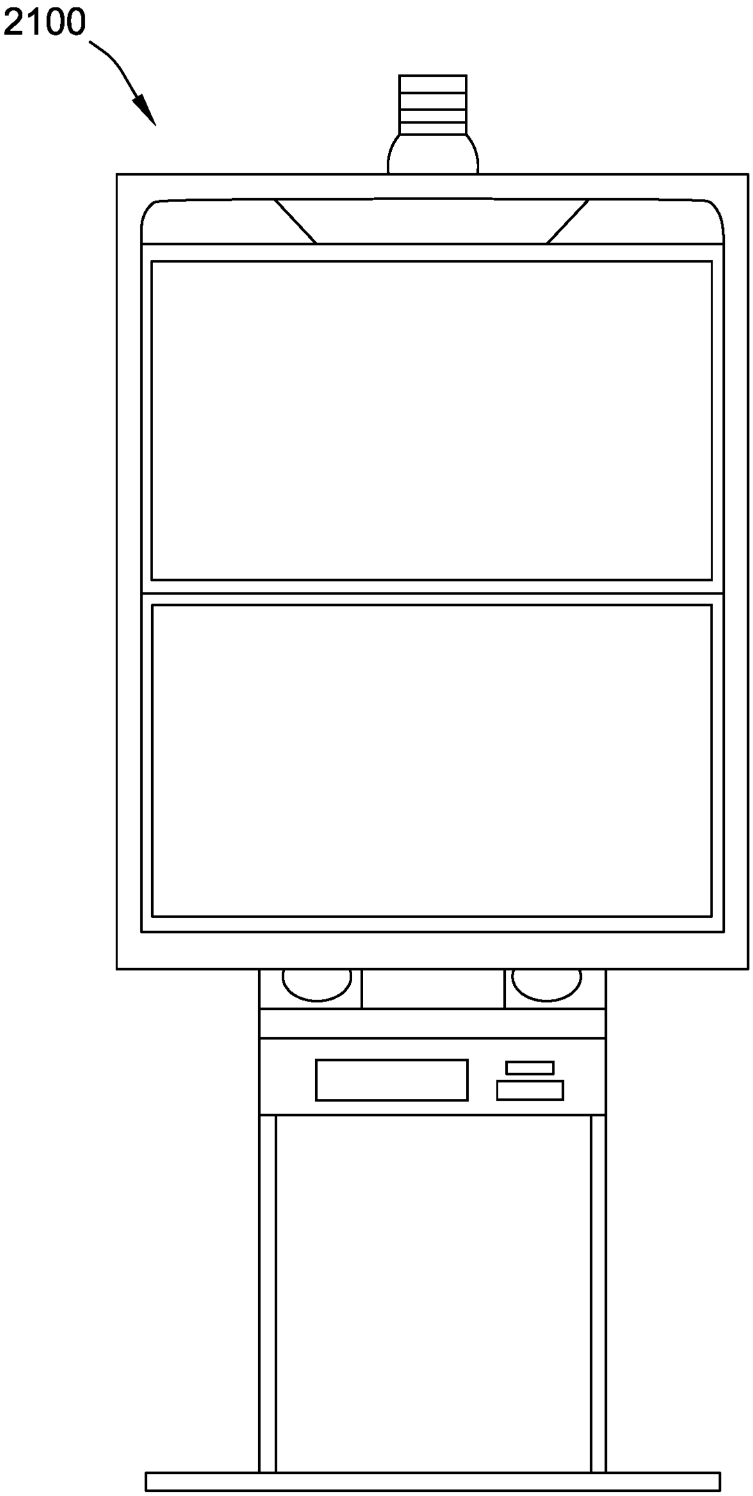
Figure 25:
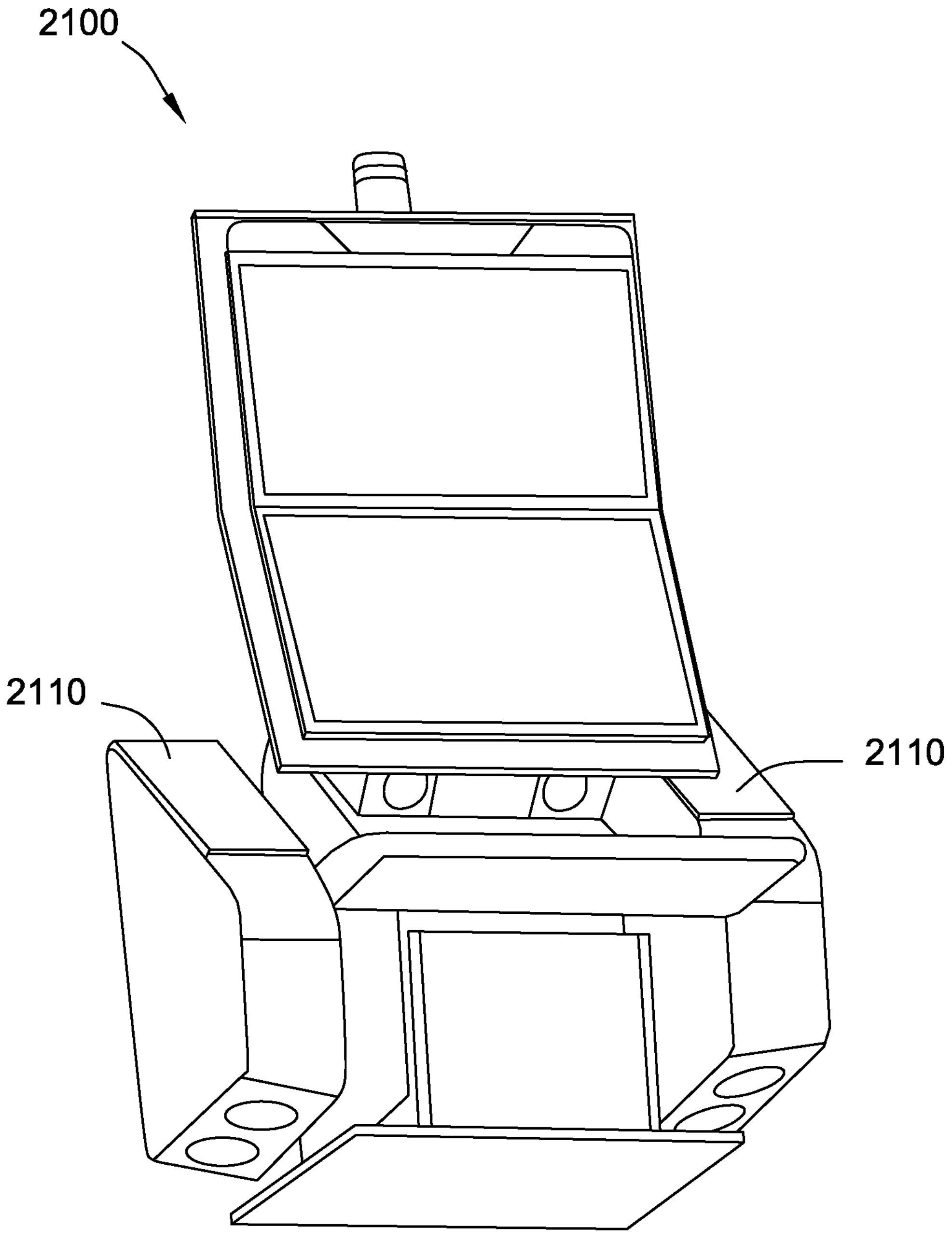

FIGS. 21 and 22 illustrate views of an exemplary modular EGM 2100. FIGS. 23 and 24 illustrate views of the exemplary modular EMG 2100 shown in FIGS. 21 and 22, but with the button deck 2105 (shown in FIG. 21) removed. In the exemplary embodiment, the button deck 2105 is removable and replaceable so that the player interface is customizable and configurable based on the desire usage of the modular electronic gaming machine 2100. In the embodiment shown in FIGS. 21 and 22, the button deck 2105 creates a customer or player interface area with a video button deck, card readers, and player card printers. In the embodiment shown in FIGS. 23 and 24, the customer or player interface area now includes the card readers and the player card printer, but the button deck 2105 has been replaced and its location covered up with a cover plate. FIG. 25 illustrates a view of the exemplary modular EGM 2100 shown in FIGS. 21 and 22, where the EGM 2100 has additional sound equipment 2110. In this case two subwoofers and premium speakers 2110. The sound equipment 2110 is positioned where the saddlebags 1125 would be on the modular EGM 1100 shown in FIG. 11.

Figure 26:
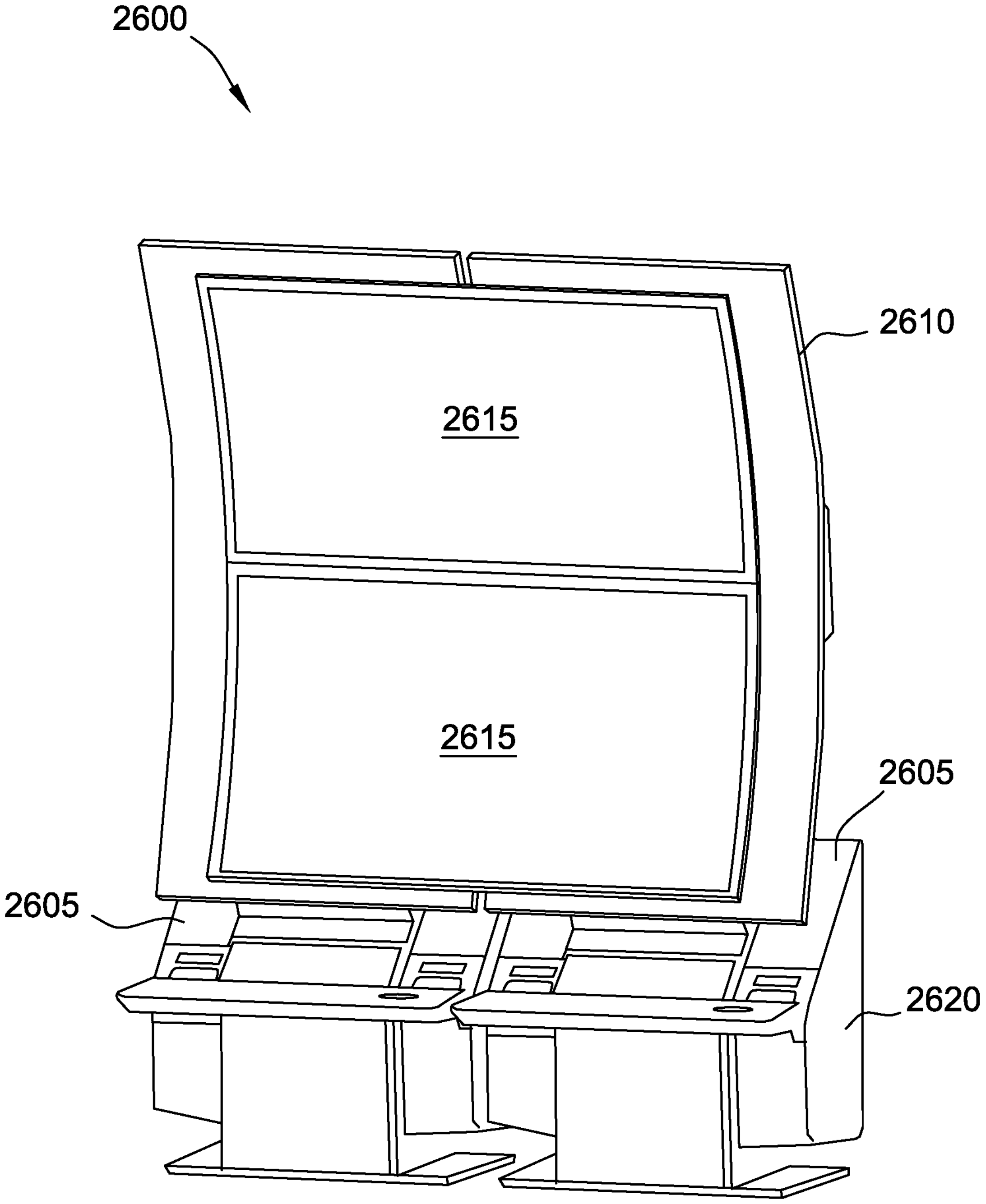
Figure 27:
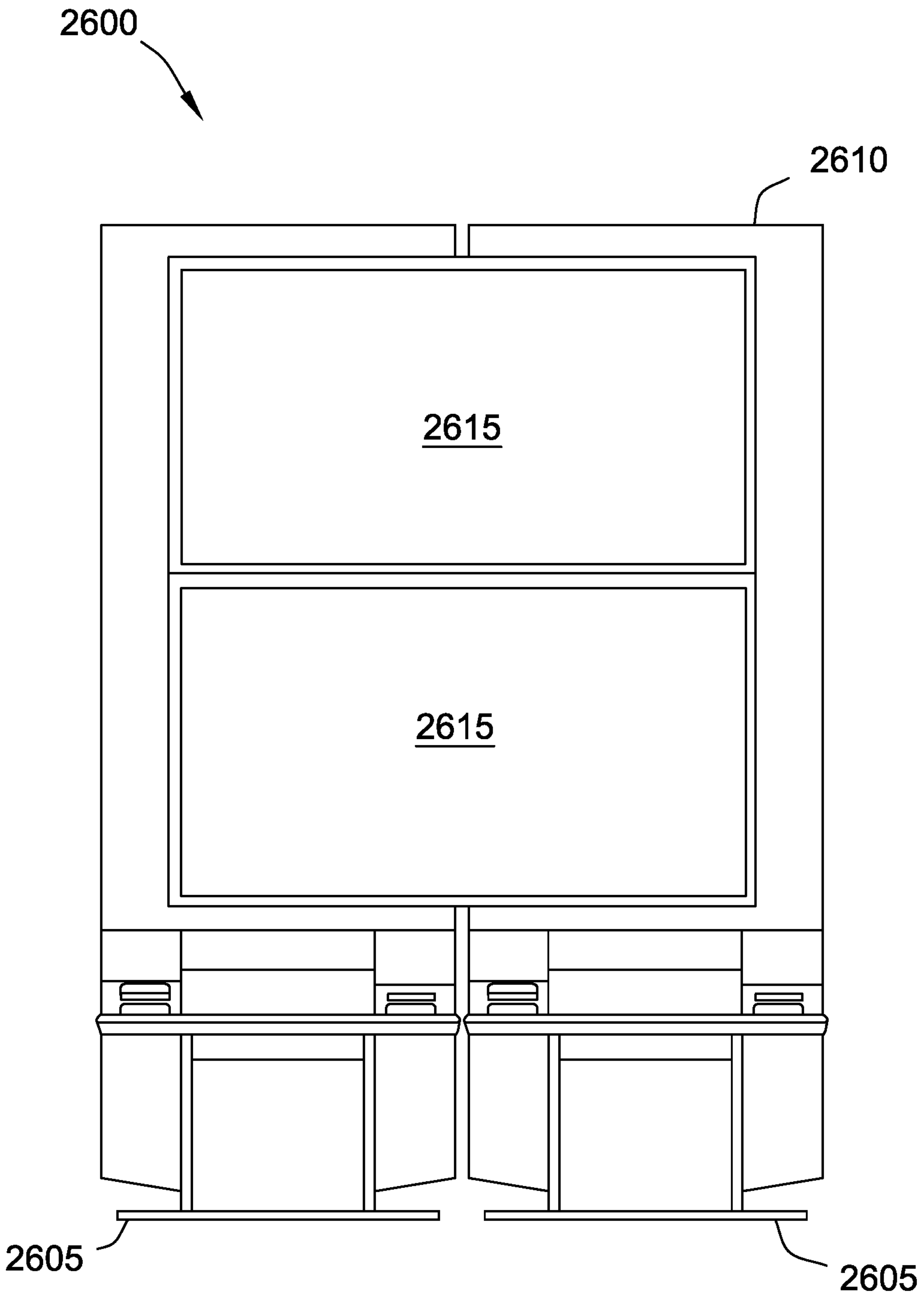

FIGS. 26 and 27 illustrate views of a large dual machine 2600 made from two modular EGMs 2605. The modular EGMS 2605 may be similar to modular EGM 2100 (shown in FIG. 21) and EGMs 104A-104X (shown in FIG. 1). In the exemplary embodiment, the modular EGMs 2605 are connected using one or more backing or braces 2610, upon which are mounted extra-large display screens 2615. The modular EGMS 2605 also support additional speakers and/or sound equipment 2620 in place of saddlebags. These machines 2605 may be combined to support a cinema style set of displays and a large sound experience.

Figure 28:
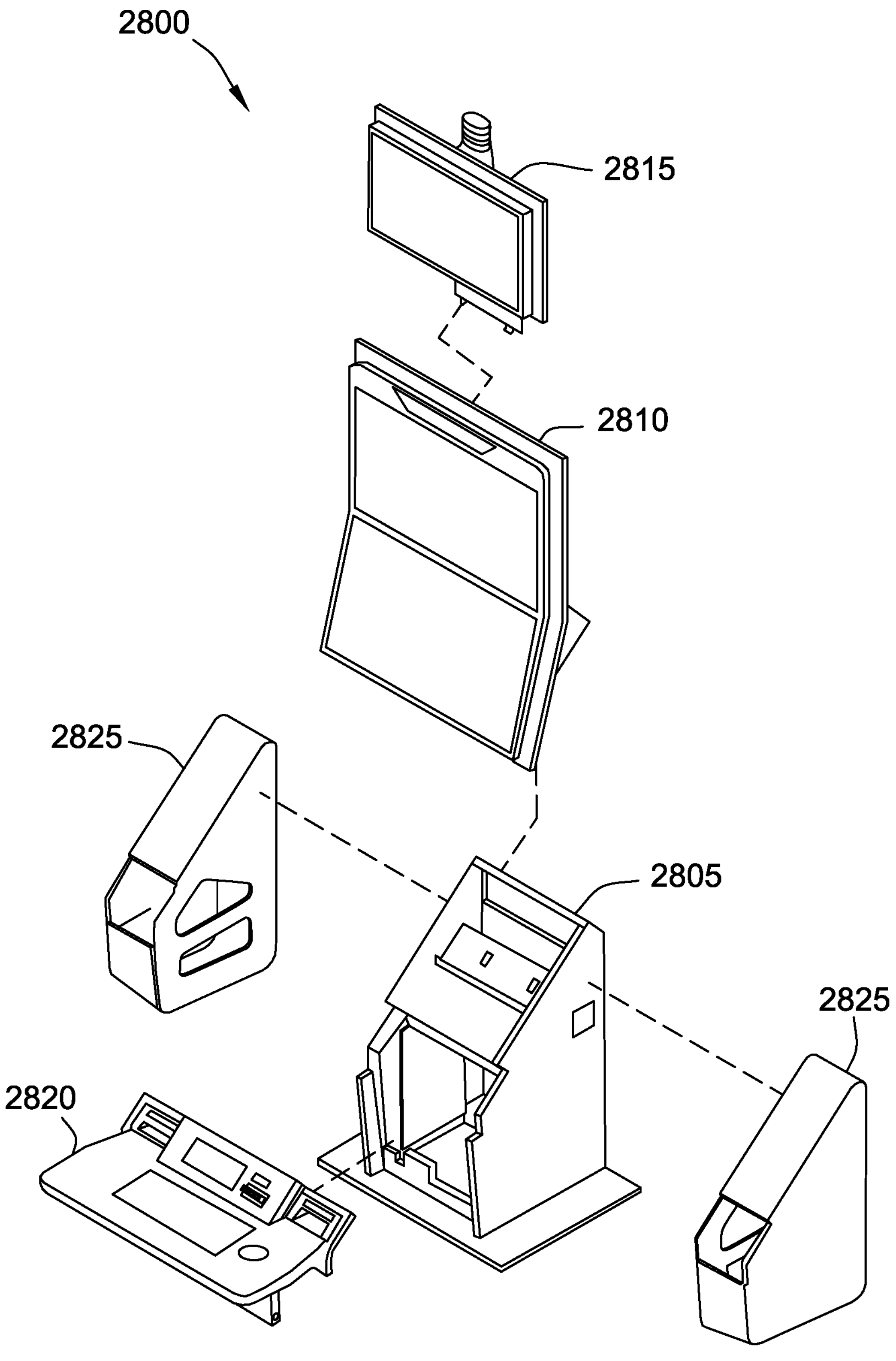

FIG. 28 illustrates an exploded view of a modular EGM 2800 with a potential fastening system as described herein. In the exemplary embodiment, modular EGM 2800 is similar to modular EGM 2100 (shown in FIG. 2100) and modular EGM 1100 (shown in FIG. 11). Modular EGM 2800 includes a structural core 2805, a display screen assembly 2810, a topper display assembly 2815, a button area 2820, and a plurality of saddlebags 2825. The exploded view shown in FIG. 28 illustrates a potential series of attachments that allow the series of peripherals to be removably attached to the structural core 2805.

Figure 29:
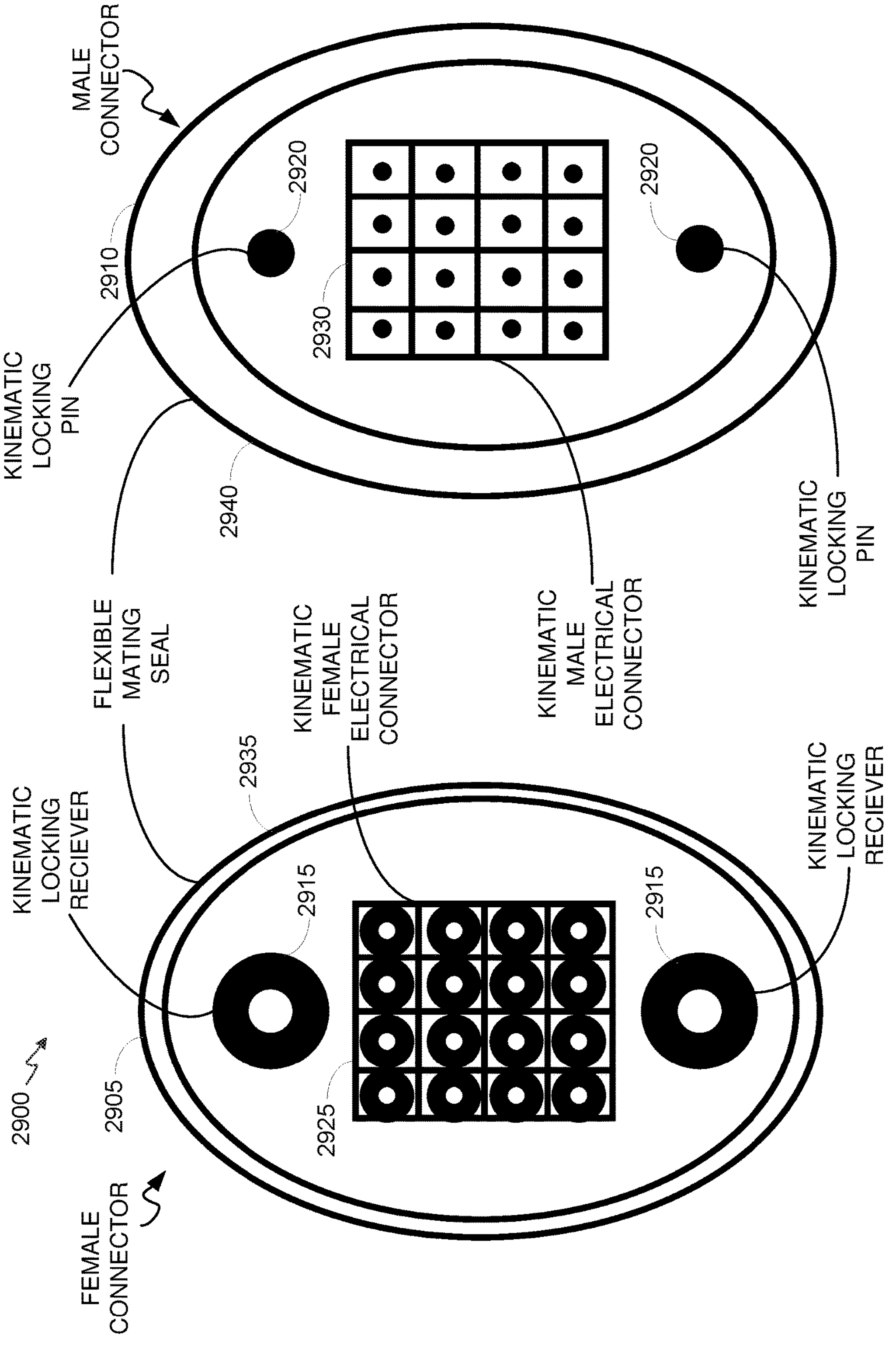
FIG. 29 illustrates a diagram of an exemplary connecting mechanism in accordance with various embodiments described herein.

FIG. 29 illustrates a diagram of an exemplary coupling mechanism 2900 in accordance with various embodiments described herein. In the exemplary embodiment, coupling mechanism 2900 includes a first coupling mechanism 2905 and a second coupling mechanism 2910. In some embodiments, the first coupling mechanism 2905 is associated with the structural core 2805 (shown in FIG. 28) and the second coupling mechanism is associated with the peripheral device. In other embodiments, the coupling mechanisms are switched. The first coupling mechanism 2905 is configured as a female connector and the second coupling mechanism 2910 is configured as a male connector. In other embodiments, each coupling mechanism may have a combination of male and female parts.

In the exemplary embodiment, the first coupling mechanism 2905 includes one or more kinematic locking receivers 2915, while the second coupling mechanism 2910 includes one or more corresponding kinematic locking pins 2920. In some embodiments, the kinematic locking receivers 2915 are considered the first guiding mechanism and the kinematic locking pins 2920 are considered the second guiding mechanism. In some embodiments, the kinematic locking receivers 2915 and the kinematic locking pins 2920 are also considered a locking mechanism.

In the exemplary embodiment, the first coupling mechanism 2905 includes one or more kinematic female electrical connectors 2925, while the second coupling mechanism 2910 includes one or more corresponding kinematic male electrical connectors 2930. In the exemplary embodiment, when the kinematic locking receivers 2915 and the kinematic locking pins 2920 are locked together, the kinematic female electrical connectors 2925 and the kinematic male electrical connectors 2930 contact each other to make an electrical connection between the structural core 2805 and the peripheral device.

In the exemplary embodiment, the first coupling mechanism 2905 and the second coupling mechanism 2910 both include a part of a flexible mating seal 2935 and 2940 that when connected seals and protects the electrical connection.

A modular electronic gaming machine that allows for parts to be swapped out to support various different configurations. In the exemplary embodiment, the structural supports of the modular gaming machine include electrical connectors 2925 and 2930, that allow the electronic parts to be connected to power. The electrical connectors 2925 and 2930 would support electrical quick-disconnect for all removable components as required. For example, a monitor 2810 could be easily removed and replaced with a newer monitor or a monitor that supports a different configuration. The side saddlebags 2825 could be removed and/or replaced with premium speakers or coverplates. The button deck 2820 could be removable and a faceplate could cover up where it used to be. In some embodiments, a modular electronic gaming machine could be converted into a kiosk. In other embodiment, two modular electronic gaming machines could be converted into a dual machine with a large display, as shown in FIGS. 26 and 27.

In some embodiments, the modular electronic gaming machine 2800 described herein allows the owner/operator to repurpose a machine. The modular EGM 2800 may have one or more peripheral devices removed and/or exchanged with different peripheral devices. For example, the modular EGM 2800 may have the button bar 2820 and the display 2810 changed to fit into different styles of games. In this example, a first style of game may include a button bar area 2820 that includes three buttons and a small screen, while the second style may include a button bar area 2820 that allows two players to play simultaneously. The modular EGM 2800 would allow the owner to remove the first button bar area 2820 and replace it with the second button bar area 2820. In some embodiments, the game controller 202 would automatically detect the change in button bar areas 2820. In other embodiments, the game controller 202 would be reprogrammed to control the new button bar area 2820. The same process may be done with the monitor 2810 or monitors 2810 as shown in the Figures. Furthermore, the modular EGM 2800 could be repurposed from a gaming machine into a kiosk, for example as shown in FIGS. 23 and 24. Depending on the functionality of the kiosk, the various peripheral devices may be removed and/or replaced. In a simple example, most of the peripheral devices may be removed leaving behind a touchscreen that could be used for providing directions to users. In another example, the saddlebags 2825 could be replaced with saddlebags 2825 that print plastic, magnetic strip cards. In this example, the kiosk could provide replacement loyalty cards.

The modular electronic gaming machine 2800 includes a plurality of structural supports. The plurality of structural supports include one or more coupling mechanisms 2900 and internal electrical wiring. The one or more coupling mechanisms 2900 include an electrical connector 2925 and 2930, a guidance mechanism 2915 and 2920, and a locking mechanism 2915 and 2920. The modular electronic gaming machine 2800 also includes at least one electrical device. The guidance mechanism 2915 and 2920 is configured to align a first electrical connector 2905 associated with a first structural support of the plurality of structural supports with a second electrical connector 2930 associated with the electrical device, such that the first electrical connector 2925 and the second electrical connector 2930 make an electrical connection that allows electrical power to flow through the internal electrical wiring to the at least one electrical device. The locking mechanism 2915 and 2920 is configured to prevent separation of the electrical connection when in a locked state.

In at least one embodiment, a modular electronic gaming machine (EGM) 2800 includes a structural core 2805 that includes a gaming controller 200 and a plurality of coupling mechanisms 2900 including a first coupling mechanism 2905. The first coupling mechanism 2905 would include an electrical connector 2925 and be configured to couple to a first peripheral device to provide electrical power and structural support to the first peripheral device. The first coupling mechanism 2905 is configured to releasably couple to the first peripheral device, so that the first peripheral device could be removed and replaced as described herein. In some embodiments, the first peripheral device is one of a button deck 1120, a display screen 1105, a saddlebag 1125, a topper display 1110, and a candle 1115. The electrical connector 2925 of the first coupling mechanism provides communication between the first peripheral device and the gaming controller 202 so that the gaming controller 202 may control the peripheral device.

In some embodiments, the first coupling mechanism 2905 includes a guidance mechanism 2915 for aligning the electrical connector 2925 of the first coupling mechanism 2905 to an electrical connector 2930 of the first peripheral device to create a proper connection. In some further embodiments, the first coupling mechanism 2905 includes a locking mechanism 2915 for preventing removal of the first peripheral device when the locking mechanism 2915 is in a locked position. In still further embodiments, the first coupling mechanism 2905 includes a sealing mechanism 2935. The sealing mechanism 2935 provides a seal to protect an electrical connection between the structural core 405 and the first peripheral device. In some embodiments, a second coupling mechanism 2905 connects the structural core 405 to a stand 1130, and wherein the stand 1130 electrically connects to an external power source and provides electrical energy to the structural core 405.

In some further embodiments, the gaming controller 202 is programmed to detect the first peripheral device when it is attached to the first coupling mechanism 2905.

In some embodiments, the modular electronic gaming machine system 2800 includes a structural core 2805 including a gaming controller 202. The modular electronic gaming machine system 2800 also includes a plurality of peripheral devices that are each removably attached to the structural core 405. Each peripheral device of the plurality of peripheral devices is attached to the structural core 405 via a coupling mechanism 2900. Each of the plurality of peripheral devices are also in electrical communication with the structural core 405. The gaming controller 202 is programmed to communicate with each of the plurality of peripheral devices.

Each coupling mechanism 2900 comprises a guidance mechanism 2915 and 2920 that is configured to align a first electrical connector 2925 associated with the structural core 2805 with a second electrical connector 2930 associated with corresponding peripheral device, such that the first electrical connector 2925 and the second electrical connector 2930 make an electrical connection that allows electrical power to flow through internal electrical wiring to the corresponding peripheral device.

In some embodiments, each coupling mechanism 2900 includes a sealing mechanism 2935 and 2940 that the sealing mechanism 2935 and 2940 provides a seal to protect the electrical connection. In some further embodiments, each coupling mechanism 2900 includes a locking mechanism 2915 and 2920 configured to prevent separation of the corresponding peripheral device from the structural core 2805 when the locking mechanism 2915 and 2920 is in a locked state.

In still further embodiments, the structural core 2805 includes a plurality of structural supports. Each of the plurality of structural supports is configured to support an attached peripheral device. Each of the plurality of structural supports also includes at least one coupling mechanism 2900.

In some embodiments, the modular electronic gaming machine 2800 is operated by removably attaching a plurality of peripheral devices to a structural core 2805 of the modular electronic gaming machine 2800. Then by controlling the plurality of peripheral devices via a gaming controller 202 integrated into the structural core 2805. A user may then remove a first device of the plurality of peripheral devices from the structural core 2805. Subsequent to removing the first device, the user may attach a second device to the structural core 2805. The second device may then by controller by the gaming controller 202. The user may also attach a first coupling mechanism 2910 associated with the second device to a second coupling mechanism 2905 associated with the structural core 2805. The user may then attach the first coupling mechanism 2910 to the second coupling mechanism 2905 by aligning a first guiding mechanism 2920 associated with the first coupling mechanism 2910 to a second guiding mechanism 2915 associated with the second coupling mechanism 2905. This may create an electrical connection between the first coupling mechanism 2910 and the second coupling mechanism 2905. This electrical connection may provide for communication between the second device and the gaming controller 202.

Connecting may also include connecting a first sealant 2935 2940 associated with one of the first coupling mechanism 2910 and the second coupling mechanism 2905 to seal the electrical connection between the first coupling mechanism 2910 and the second coupling mechanism 2905. In some embodiments, subsequent to connecting, the gaming controller 202 may detect the second device.

Advantages of these modular electronic gaming devices include, but are not limited to, reduced inventory and more inventory flexibility which provides cost savings; reduced training on the manufacturing floor and for the service and install teams, as the common core layout of components is consistent across multiple cabinets; the training of casino personnel is also reduced, as the cabinets utilize a common core concept; and the ability for a casino operator to reconfigure the casino floor by not only changing the location of the EGMs but also the look of the EGM without investing in a completely new cabinet. This reduces costs to maintain a fresh gaming experience for the patrons of the casino.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming machine comprising:

a core comprising a first kinematic coupling mechanism, the first kinematic coupling mechanism comprising a first electrical connector, and one of a kinematic receiver and a kinematic pin; and a first peripheral device attached to the core by a second kinematic coupling mechanism, the second kinematic coupling mechanism comprising a second electrical connector and the other of the kinematic receiver and the kinematic pin, the first kinematic coupling mechanism of the core is configured to couple to the second kinematic coupling mechanism of the first peripheral device to form an electrical connection between the first peripheral device and the core.

2. The electronic gaming machine of claim 1, wherein the first peripheral device is one of a button deck, a display screen, a saddlebag, a topper display, or a candle.

3. The electronic gaming machine of claim 1, wherein the first kinematic coupling mechanism is configured to releasably couple to the second kinematic coupling mechanism.

4. The electronic gaming machine of claim 1, wherein the kinematic receiver and the kinematic pin provide a guidance mechanism for aligning the first electrical connector of the first kinematic coupling mechanism to the second electrical connector of the first peripheral device.

5. The electronic gaming machine of claim 1, wherein the first kinematic coupling mechanism further comprises a locking mechanism for preventing removal of the first peripheral device from being coupled with the core when the locking mechanism is in a locked position.

6. The electronic gaming machine of claim 1, wherein one or more of the first kinematic coupling mechanism and the second kinematic coupling mechanism further comprises a sealing mechanism, wherein the sealing mechanism provides a seal to protect the electrical connection between the core and the first peripheral device.

7. The electronic gaming machine of claim 1, wherein the electrical connection provides one or more of electrical power or data transfer between the first peripheral device and the core.

8. The electronic gaming machine of claim 1, wherein the core further comprises a game controller programmed to detect the first peripheral device when the first peripheral device is attached to the core by the first kinematic coupling mechanism.

9. An electronic gaming system comprising:

a core including a plurality of core kinematic coupling mechanisms for attaching to peripheral devices; and a plurality of peripheral devices, wherein the plurality of peripheral devices are each removably coupled to the core, wherein at least one peripheral device of the plurality of peripheral devices is attached to the core by a peripheral kinematic coupling mechanism, and the at least one peripheral device is in electrical communication with the core via one or more electrical connectors provided within the peripheral kinematic coupling mechanism.

10. The electronic gaming system of claim 9, wherein each peripheral kinematic coupling mechanism and core kinematic coupling mechanism comprises a guidance mechanism configured to align a first electrical connector associated with the core with a second electrical connector associated with a corresponding peripheral device when attaching an associated peripheral kinematic coupling mechanism with an associated core kinematic coupling mechanism to form a kinematic coupling pair, such that the first electrical connector and the second electrical connector make an electrical connection that allows electrical power to flow to the corresponding peripheral device.

11. The electronic gaming system of claim 10, wherein each kinematic coupling pair further comprises a sealing mechanism, wherein the sealing mechanism provides a seal to protect the electrical connection.

12. The electronic gaming system of claim 10, wherein each kinematic coupling pair comprises a locking mechanism configured to prevent separation of the corresponding peripheral device from the core when the locking mechanism is in a locked state.

13. The electronic gaming system of claim 9, wherein the core further comprises a plurality of structural supports, wherein each of the plurality of structural supports is configured to support an attached peripheral device.

14. The electronic gaming system of claim 9, wherein the core further comprises a game controller programmed to communicate with the at least one peripheral device.

15. A method of configuring an electronic gaming machine comprising:

removably attaching at least one peripheral device to a core of the electronic gaming machine, wherein the attaching includes connecting a kinematic coupling mechanism of the at least one peripheral device to a corresponding kinematic coupling mechanism of the core, thereby forming a mated pair of kinematic coupling mechanisms that establishes an electrical connection between the core and the at least one peripheral device;

removing the at least one peripheral device from the core; and subsequent to removing the at least one peripheral device, attaching a second peripheral device to the core, thereby establishing an electrical connection between the core and the second peripheral device.

16. The method of claim 15, wherein attaching the second peripheral device includes automatically connecting a first kinematic coupling mechanism associated with the second peripheral device to a second kinematic coupling mechanism associated with the core.

17. The method of claim 16, wherein attaching the first kinematic coupling mechanism to the second kinematic coupling mechanism further comprises aligning a first guiding mechanism associated with the first kinematic coupling mechanism to a second guiding mechanism associated with the second kinematic coupling mechanism.

18. The method of claim 16 wherein attaching the second peripheral device provides for communication between the second peripheral device and a game controller of the core.

19. The method of claim 18 further comprising connecting a first sealant associated with one of the first kinematic coupling mechanism and the second kinematic coupling mechanism to seal the connection between the first kinematic coupling mechanism and the second kinematic coupling mechanism.

20. The method of claim 15 further comprising:

controlling the at least one peripheral device by a gaming controller of the core;

detecting, by the gaming controller, the attaching of the second peripheral device; and controlling the second peripheral device via the gaming controller.

* * * * *